(12) United States Patent
Izu et al.

(10) Patent No.: US 8,452,973 B2
(45) Date of Patent: *May 28, 2013

(54) DIGITAL SIGNATURE METHOD, PROGRAM, AND APPARATUS

(75) Inventors: Tetsuya Izu, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 431 days.

This patent is subject to a terminal disclaimer.

(21) Appl. No.: 12/688,952

(22) Filed: Jan. 18, 2010

(65) Prior Publication Data

US 2010/0185867 A1 Jul. 22, 2010

(30) Foreign Application Priority Data

Jan. 19, 2009 (JP) .................................. 2009-008465

(51) Int. Cl.
*H04L 9/32* (2006.01)
(52) U.S. Cl.
USPC .......................................................... 713/179
(58) Field of Classification Search
USPC .......................................... 713/176, 179, 180
See application file for complete search history.

(56) References Cited

U.S. PATENT DOCUMENTS

| | | | | |
|---|---|---|---|---|
| 2005/0015600 | A1* | 1/2005 | Miyazaki et al. | 713/176 |
| 2006/0117183 | A1* | 6/2006 | Hatano et al. | 713/176 |

FOREIGN PATENT DOCUMENTS

| | | | |
|---|---|---|---|
| JP | 2004-364070 A | 12/2004 |
| JP | 2006-060722 A | 3/2006 |

OTHER PUBLICATIONS

Benaloh, Josh et al., "One-way accumulators: A decentralized alternative to digital signatures", *Eurocrypt '93* May 23, 1993, p. 274-285.
Boneh, Dan et al., "Aggregate and Verifiably Encrypted Signatures from Bilinear Maps", *Eurocrypt 2003* May 4, 2003, p. 416-432.
Lysyanskaya, Anna et al., "Sequential Aggregate Signatures from Trapdoor Permutations", *Eurocrypt 2004* May 2, 2004, p. 74-90.
Sano, Makoto et al., "On Sanitizable and Deletable Signature Schemes", *Proceedings of Symposium on Cryptography and Information Security (SCIS) 2007* Jan. 23, 2007, p. 156 (translation of p. 156 provided).
USPTO, [TRAN], U.S. Appl. No. 12/645,469 (related), [CTNF] Non-Final Office Action issued on Jan. 30, 2012.

* cited by examiner

*Primary Examiner* — Ellen Tran
(74) *Attorney, Agent, or Firm* — Fujitsu Patent Center

(57) ABSTRACT

A method for generating a digital signature with respect to an electronic document, the method including: inputting a target electronic document and a corresponding digital signature σ; dividing the target electronic document into a plurality of partial documents mi; and when a revision of the partial documents is to be performed, in a case where deletion of the one partial document is to be performed, when sanitization is not prohibited, exponentiating the digital signature σ twice with a hash value Gi, when sanitization is prohibited, exponentiating σ with the Gi; in a case where sanitization is to be performed, replacing a partial document by Gi; in a case where deletion is to be prohibited, exponentiating σ with a hash value Hi; in a case where the sanitization is to be prohibited, exponentiating σ with Gi; and updating σ.

18 Claims, 28 Drawing Sheets

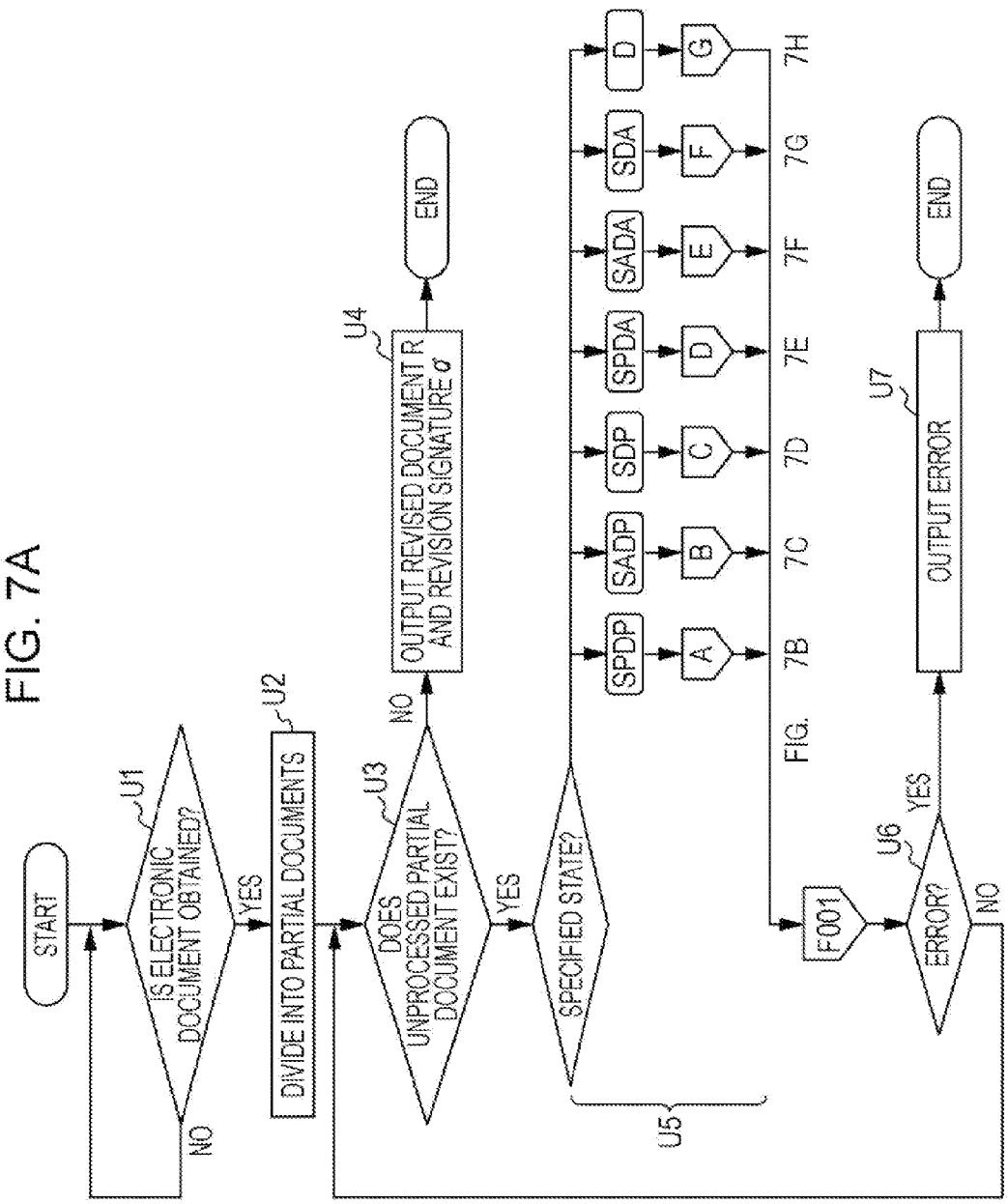

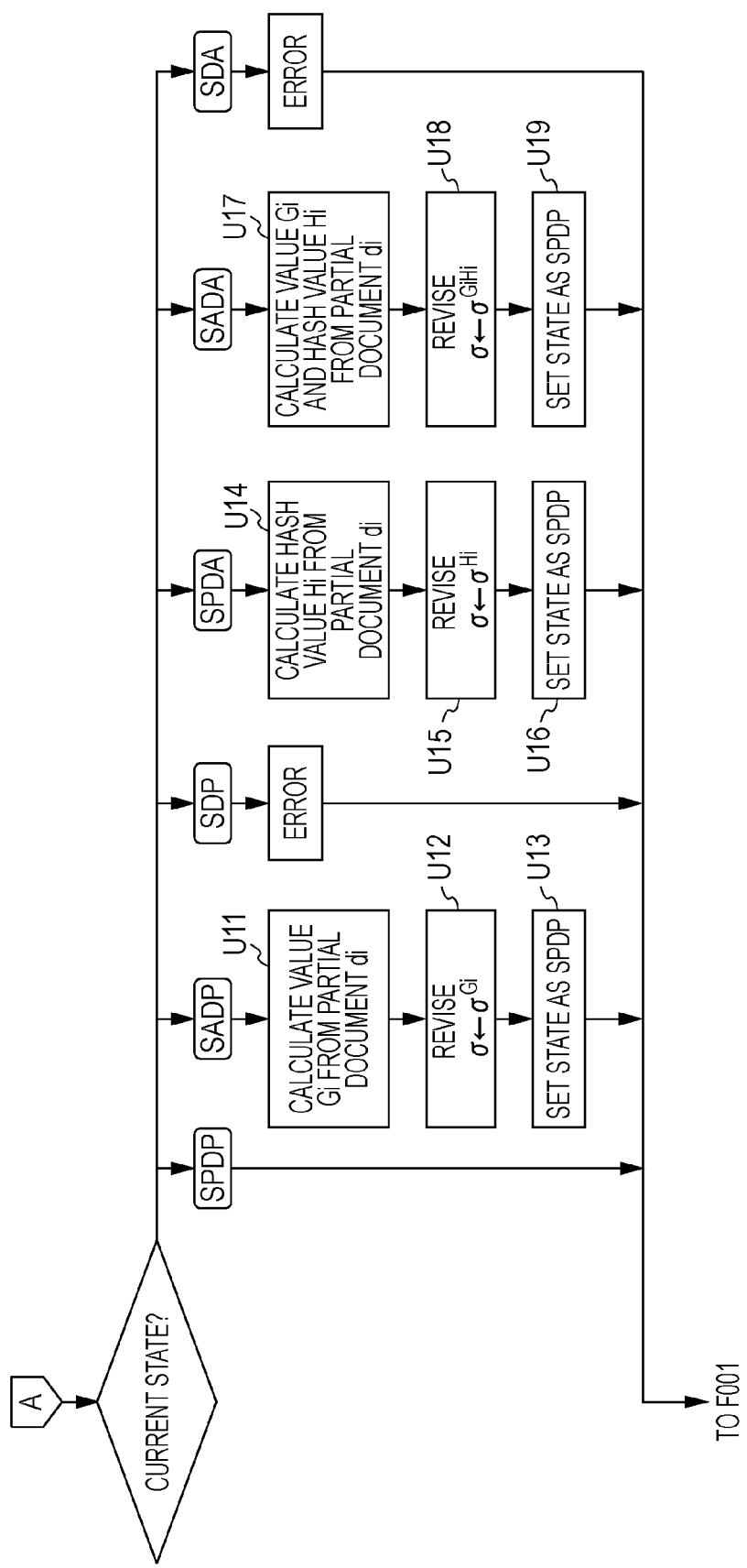

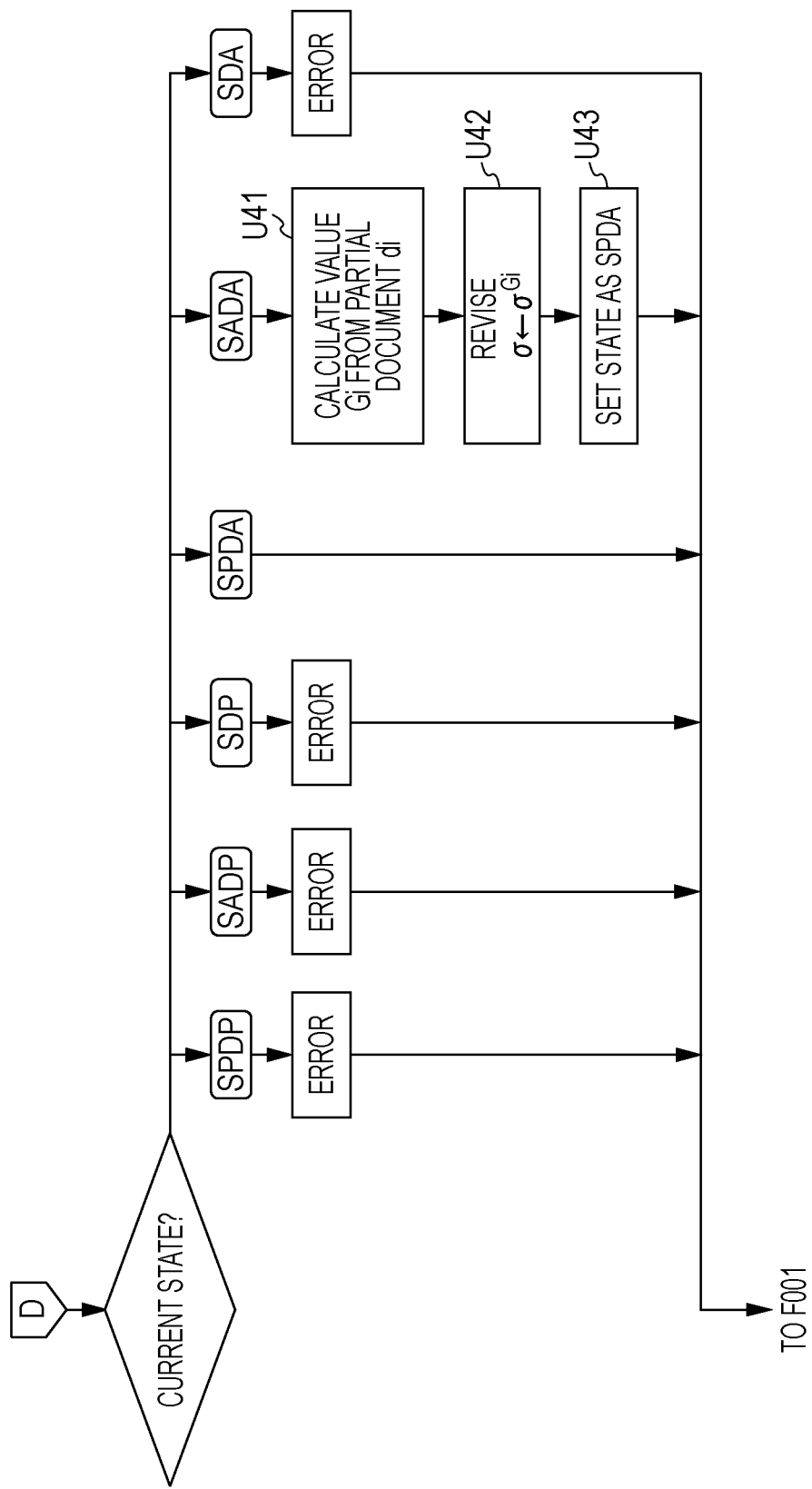

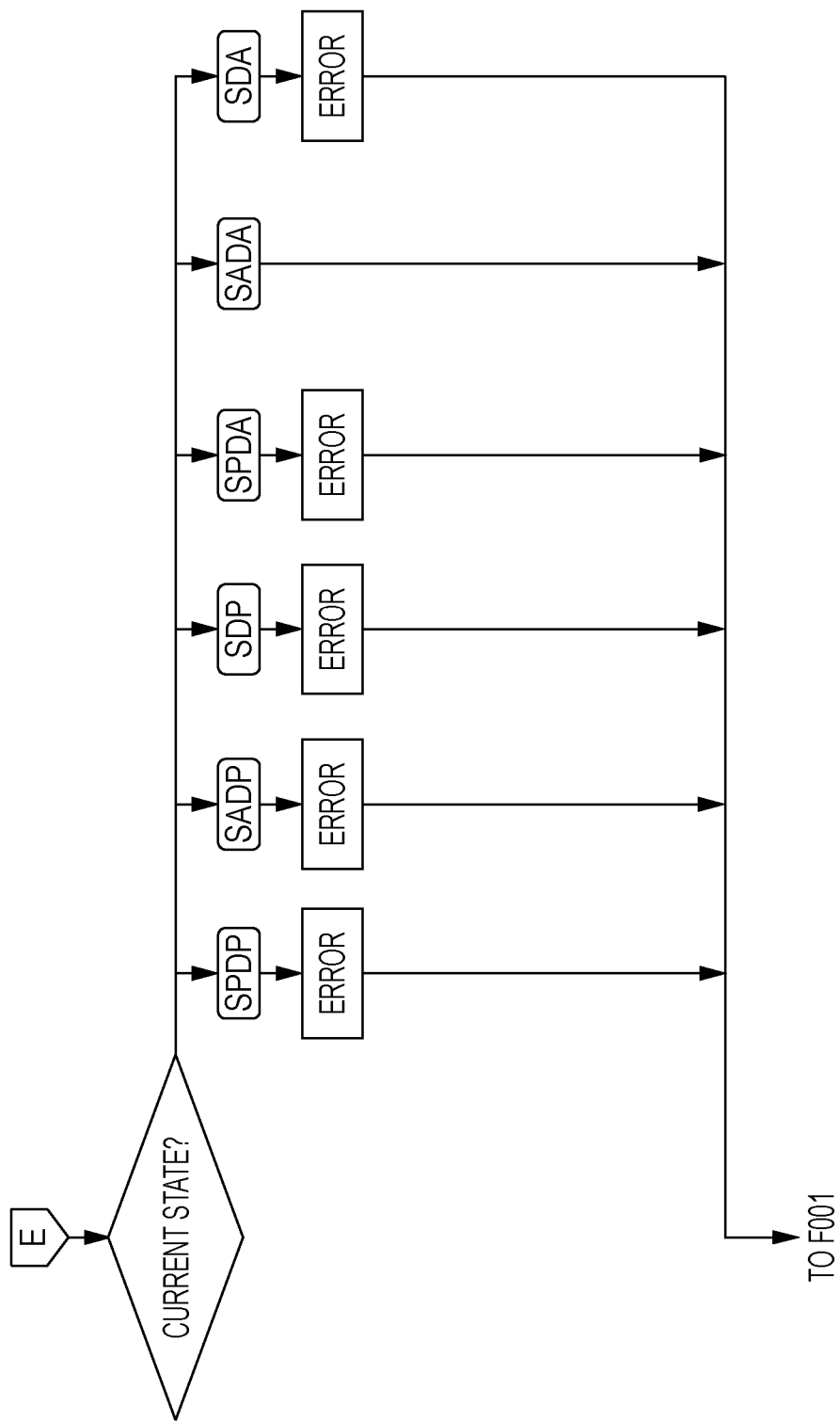

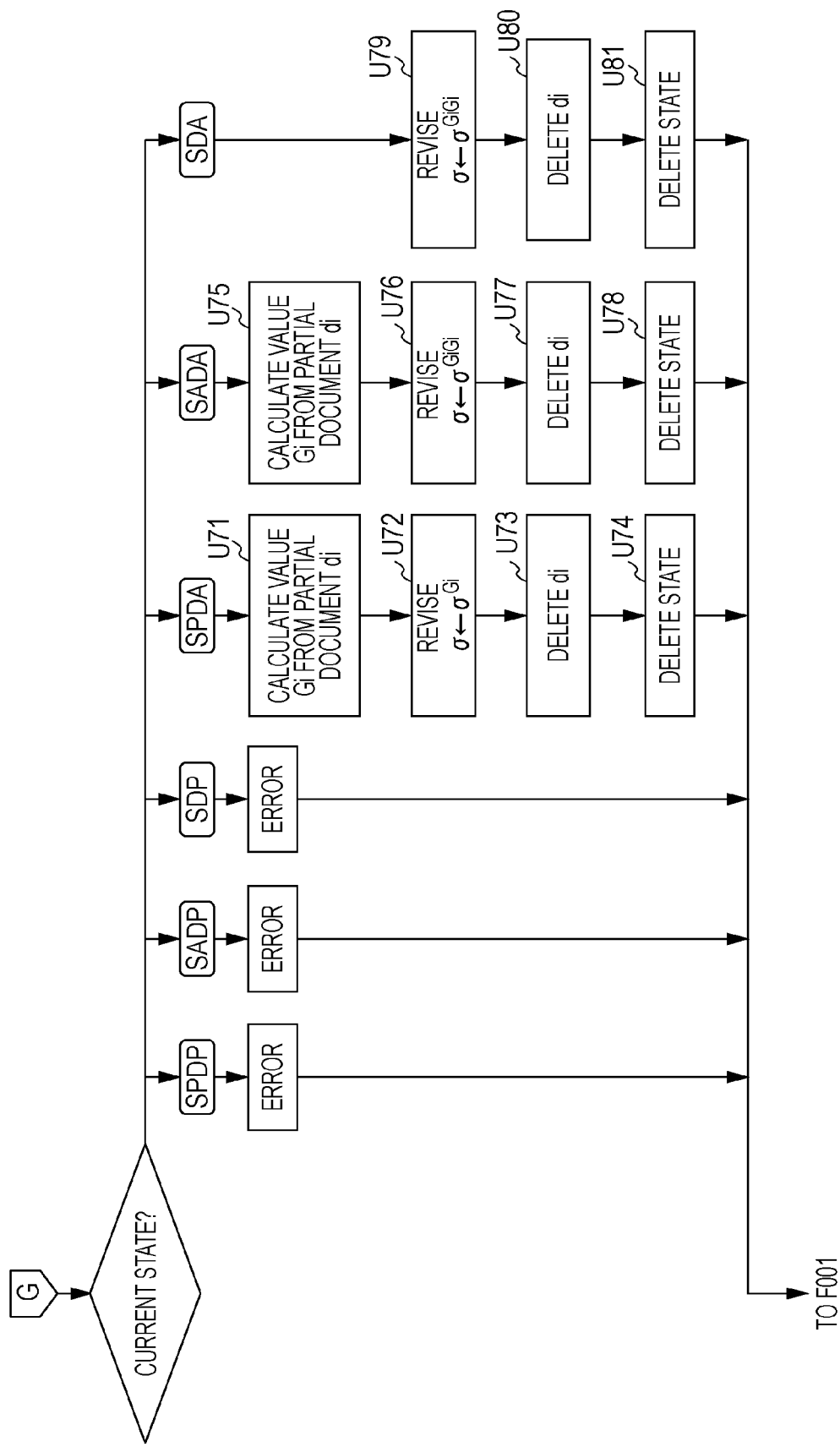

FIG. 9

| PARTIAL DOCUMENT STATE | PARTIAL DOCUMENT | SIGNATURE |
|---|---|---|
| SADA | di | $v^{1/GiGi}$ |
| SPDA | di | $v^{1/Gi}$ |
| SADP | di | $v^{Hi/GiGi}$ |
| SPDP | di | $v^{Hi/Gi}$ |
| SDA | Gi | $v^{1/GiGi}$ |
| SDP | Gi | $v^{1/Gi}$ |
| D | NONE | v |

FIG. 10

| | STATE TRANSIENT | | PARTIAL DOCUMENT REVISION | SIGNATURE REVISION | | STATE TRANSIENT | | PARTIAL DOCUMENT REVISION | SIGNATURE REVISION |
|---|---|---|---|---|---|---|---|---|---|
| T1 | SADA→SPDA | | | $\sigma \leftarrow \sigma^{Gi}$ | T7 | SPDA→SPDP | | | $\sigma \leftarrow \sigma^{Hi}$ |
| T2 | SADA→SPDP | | | $\sigma \leftarrow \sigma^{GiHi}$ | T8 | SPDA→D | | DELETE di | $\sigma \leftarrow \sigma^{Gi}$ |
| T3 | SADA→SADP | | di←Gi | $\sigma \leftarrow \sigma^{Hi}$ | T9 | SADP→SPDP | | | $\sigma \leftarrow \sigma^{Gi}$ |
| T4 | SADA→SDP | | di←Gi | $\sigma \leftarrow \sigma^{Hi}$ | T10 | SADP→SDP | | di←Gi | |
| T5 | SADA→SDA | | DELETE di | | T11 | SDA→SDP | | | $\sigma \leftarrow \sigma^{Hi}$ |
| T6 | SADA→D | | DELETE di | $\sigma \leftarrow \sigma^{GiGi}$ | T12 | SDA→D | | DELETE di | $\sigma \leftarrow \sigma^{GiGi}$ |

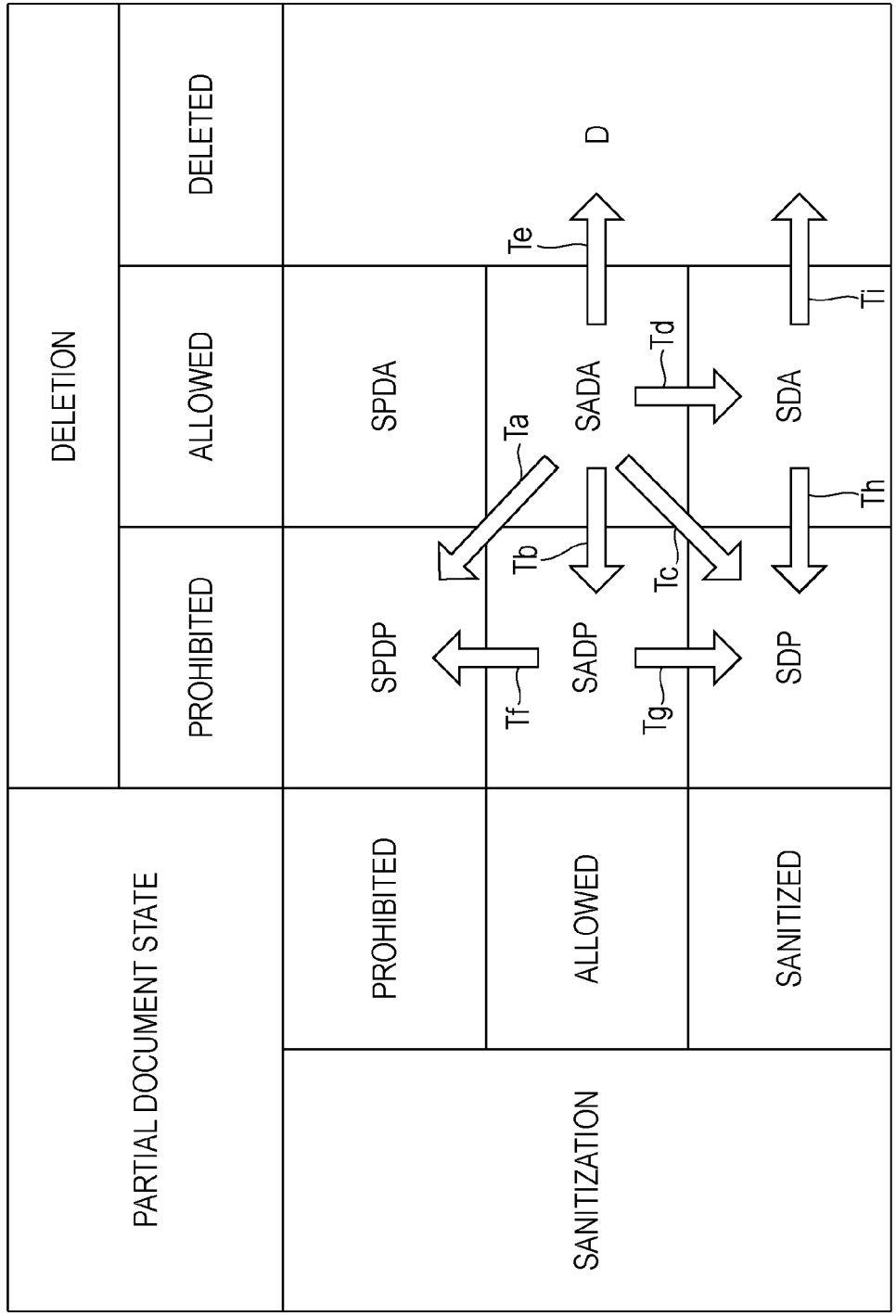

DIGITAL SIGNATURE METHOD, PROGRAM, AND APPARATUS

CROSS-REFERENCE TO RELATED APPLICATIONS

This application is based upon and claims the benefit of priority from the prior Japanese Patent Application No. 2009-8465 filed on Jan. 19, 2009, the entire contents of which are incorporated herein by reference.

FIELD

Embodiments of the present invention relate to a digital signature method, a digital signature program, and a digital signature apparatus for securing the integrity of an electronic document.

BACKGROUND

A digital signature is proposed as a technology for securing the integrity of an electronic document. While developing utilization and application of the electronic document, a large number of demands exist for taking out a part of a signed electronic document, that is, extracting a part of the document. However, in a general digital signature, such an extraction is regarded as an alteration of the document, and the integrity may not be secured. As a technology for solving this, an applied digital signature technology is proposed for enabling a partial extraction by way of a sanitization signature and a deletion signature. These signatures may secure the integrity of the relevant part even when the extraction is performed.

Here, the extraction signature is defined. The general digital signature is defined by a two-person model including a signer for signing a signature and a verifier for performing verification. In contrast to this, in the extraction signature, as shown in FIG. 11, a three-person model is used including a signer for signing a signature, an extractor for extracting a part of the document signed by the signer, and a verifier for verifying the extracted document. The signer signs a document through any method. Then, the extractor receives the document and the signature. The extractor extracts a part of the received document, and generates extraction information and updates the signature accompanied by the extraction. Then, the verifier receives the extracted document and the signature as well as the extraction information. The verifier verifies that the extracted document is a part of the document signed by the signer on the basis of the extracted document and the signature as well as the extraction information. A signature scheme capable of satisfying the above-mentioned flow is defined as the extraction signature.

In order to perform the sanitization signature or the deletion signature, the document is divided into a plurality of partial documents in advance, and a signature processing or a part of the signature processing is performed with respect to those partial documents. According to the sanitization signature or the deletion signature in the related art, information on the signatures is enormous in proportion to the number of the partial documents at the time of signing. Also, the sanitization signature and the deletion signature in the related art need to have much extraction information in proportion to the number of the partial documents to be extracted at the time of extraction or the number of the partial documents to be deleted. For that reason, in order to extract a part of a large document, a great amount of signature information or a great amount of extraction information is prepared. That is, the signature system is extremely inefficient.

As a representative of the sanitization signature, for example, SUMI-4 is proposed. SUMI-4 is disclosed, for example, in Japanese Unexamined Patent Application Publication No. 2004-364070. According to this signature system, only one signature is used irrespective of the number of the partial documents. However, this signature system needs to have a hash value group of the partial documents to be deleted at the time of the extraction, and therefore the extraction information is increased in proportion to the number of the partial documents to be deleted.

This will be described with reference to FIGS. 12A and 12B. At the time of the signing, a signer divides document information M into partial document information $m_1$ to $m_4$, and partial document information ID information $ID_1$ to $ID_4$ are attached to the respective pieces of the partial document information to generate ID attached partial documents $M_1$ to $M_4$. Then, the signer calculates hash values $h_1$ to $h_4$ and signs with respect to the hash values $h_1$ to $h_4$ (a signature $\sigma$) to send the ID attached partial documents $M_1$ to $M_4$ and the signature $\sigma$ to the extractor. At the time of the extraction, the extractor decides an ID attached partial document to be extracted. At this time, the extractor extracts the ID attached partial document $M_2$. Then, the extractor calculates the hash values $h_1$, $h_3$, and $h_4$ of the ID attached partial documents $M_1$, $M_3$, and $M_4$ which are to be deleted, that is, which are not extracted and discloses $h_1$, $M_2$, $h_3$, $h_4$, and the signature $\sigma$ of the signer to the public. That is, instead of the ID attached partial documents $M_1$, $M_3$, and $M_4$ to be deleted, the hash values $h_1$, $h_3$, and $h_4$ are disclosed. At the time of signature verification, by calculating the hash value $h_2$ from the public ID attached partial document information $M_2$, the verifier reconstructs the hash values $h_1$ to $h_4$ together with the public $h_1$, $h_3$, and $h_4$ and performs the verification with the signature $\sigma$. As the signature $\sigma$ is given with respect to the hash values $h_1$ to $h_4$ by the signer, the verifier may verify that the extracted ID attached partial document $M_2$ is a part of the document M signed by the signer. At this time, in a case where the extraction is performed, if the hash value is not disclosed instead of the ID attached partial document to be deleted, the verifier may not perform the verification. For that reason, it is necessary to hold the "extraction information" which is the information in proportion to the number of the partial documents to be deleted, and if the number of the ID attached partial documents to be deleted is large, the extraction information necessary to be held becomes large.

Also, as a representative of the deletion signature, for example, SUMI-6 is proposed. SUMI-6 is disclosed, for example, in Japanese Unexamined Patent Application Publication No. 2006-60722. According to this signature system, it is necessary to hold indivisual signatures with respect to the respective partial documents and an entirety signature in which the indivisual signatures are aggregated at the time of the signing. For that reason, a problem occurs that the signature information is enlarged in proportion to the number of the partial documents.

This will be described with reference to FIGS. 13A and 13B. Similarly as in FIGS. 12A and 12B, at the time of the signing, the signer divides the document information M into the partial document information $m_1$ to $m_4$ and attaches the partial document information ID information $ID_1$ to $ID_4$ to the respective pieces of the partial document information to generate the ID attached partial documents $M_1$ to $M_4$. Then, the signer calculates the hash values $h_1$ to $h_4$ and also calculates indivisual Signatures $\sigma_1$ to $\sigma_4$ through an aggregate signature which will be described below and aggregates the indivisual signatures $\sigma_1$ to $\sigma_4$ to create an entirety signature $\sigma$. Finally, the signer sends the ID attached partial documents $M_1$ to $M_4$ and the indivisual signatures $\sigma_1$ to $\sigma_4$, and the entirety signature $\sigma$ to the extractor. At the time of the extraction, the extractor decides the ID attached partial document to be extracted. At this time, it is set that the extractor extracts the ID attached partial document $M_2$. The extractor deletes the ID attached partial documents $M_1$, $M_3$, and $M_4$ which are not extracted and utilizes the corresponding indivisual signatures $\sigma_1$, $\sigma_3$, and $\sigma_4$ to delete the information on $\sigma_1$, $\sigma_3$, and $\sigma_4$ from the entirety signature $\sigma$ for updating the entirety signature to $\sigma'$. Finally, the extractor discloses the extracted ID attached partial document $M_2$ and the indivisual signature $\sigma_2$, and the updated entirety signature $\sigma'$ to the public. At the time of the signature verification, the verifier verifies the public ID attached partial document information $M_2$ and the updated entirety signature $\sigma'$. From the signature $\sigma'$, information on the indivisual signatures of the ID attached partial documents $M_1$, $M_3$, and $M_4$ deleted by the extractor from the entirety signature $\sigma$ of the signer is deleted. For that reason, the verifier may verify that the extracted ID attached partial document $M_2$ is a part of the document M signed by the signer.

At this time, through this system, in a case where the signing is performed, the extraction may not be performed unless indivisual signature information is attached. For that reason, it is necessary to hold signature information in proportion to the number of the partial documents to be signed. That is, if the number of the ID attached partial documents to be signed is large, the signature information necessary to be held becomes large.

That is, in a sanitization signature based extraction, although the number of the signature used at the time of signing is one (small data amount), but in addition to the signature at the time of signing, extraction information by the number of the partial documents to be deleted needs to be held (large data amount) at the time of the extraction. In the deletion signature based extraction, at the time of extraction, the extracted document, an individual signature thereof, and the updated entirety signature are only used (small data amount), but in addition to the "entirety signature", the "individual signatures" by the number of the partial documents needs to be held (large data amount) at the time of the signing.

On the other hand, an application technology on a digital signature called aggregate signature exists. With the aggregate signature, in a case where a signature needs to be assigned by one or a plurality of signers on one or a plurality of documents in an electronic document circulation, it is possible to reduce the signature data amount by aggregating the signatures.

A representative feature of the aggregate signature will be illustrated. In a case where a plurality of documents are signed by a plurality of signers, as shown in FIG. 14, when a standard digital signature is used, the signature data by the number of documents needs to be used. In contrast to this, when the aggregate signature is used, as shown in FIG. 15, it is possible to use one signature by aggregating the signatures of the respective documents. That is, it is possible to reduce the signature data amount.

Currently, as a construction method for the aggregate signature, for example, a sequential aggregate signature based on the RSA signature described in a document A. Lysyanskaya, et al., "Sequential Aggregate Signatures from Trapdoor Permutations," EUROCRYPT 2004, LNCS 3027, pp. 74-90, 2004 is known. Also, a general aggregate signature based on pairing which is one of the elliptic curve cryptosystem technologies is known, which is described in a document described in D. Boneh, et al., "Aggregate and Verifiably Encrypted Signatures from Bilinear Maps", EUROCRYPT 2003, LNCS 2656, pp. 416-432, 2003. The general aggregate signature is used in the above-mentioned deletion signature.

Furthermore, a technology called RSA accumulator is disclosed, for example, in a document, J. Benaloh, and M. de Mare, "One-way accumulators: A decentralized alternative to digital signatures," EUROCRYPT '93, LNCS 765, pp. 274-285, Springer-Verlag, 1994. The RSA accumulator is one type of a hash function based on an RSA encryption and has an aggregation function. The RSA accumulator uses N which is a product of two prime numbers p, q like the RSA cryptosystem. Then, the RSA accumulator uses a generator g (which is coprime to N) with its order $\phi=\text{LCM}(p-1)(q-1)$. The RSA accumulator has a pseudo-commutative characteristic with assuming the RSA assumption. Herein, in all $x \in X$ and also all $y1, y2 \in Y$, when a function $f: X \times Y \rightarrow X$ satisfies the following characteristic, the function f has the pseudo-commutative characteristic.

$$f(f(x,y1),y2)=f(x,y2),y1)$$

To elaborate, in a case where the function f is repeatedly applied any number of times, the function f has such a characteristic that the order may be changed, which is so-called commutative with respect to y. The RSA accumulator in the above-mentioned document realizes the function f by the following expression.

$$f_N(x,y)=x^{H(y)} \bmod N$$

Where, H denotes a unidirectional hash function which is, for example, SHA-1 or the like. In the RSA accumulator, the following relation is established.

$$g^{H(y1) \times H(y2)} \bmod N = (g^{H(y1)} \bmod N)^{H(y2)} \bmod N = (g^{H(y2)} \bmod N)^{H(y1)}$$

That is, aggregation of the hash values in no particular order may be realized. In addition to this, as the RSA accumulator has the unidirectional characteristic, from $(g^{H(y)} \bmod N)$ and H(y), N, it is assumed to be difficult to calculate y (so-called RSA assumption)

Incidentally, according to the above-mentioned sanitization signature technology, the deletion signature technology, and the sanitization and deletion technology, various states related to sanitization and deletion may be set to the respective partial documents. Here, the various states set to the respective partial documents will be described. It should be noted that a related technology is disclosed in "On sanitizable and deletable signature schemes", M. Sano, T. Izu, N. Kunihiro, K. Ohta, and M. Takenaka, Proceedings of the Symposium on Cryptography and Information Security (SCIS2007), P. 156, January 2007.

FIG. 16 shows partial document states and state transients in the related art. In FIG. 16, a chart 3400 represents various states which may be set to the respective partial documents. To be specific, six states are represented in combination of prohibited, allowed, and sanitized/deleted related to the sanitization(hiding) and the deletion.

At this time, these six states are respectively denoted by SADA (sanitization allowed, deletion allowed), SPDP (sanitization prohibited, deletion prohibited), SADP (sanitization allowed, deletion prohibited), SDA (sanitized, deletion allowed), SDP (sanitized, deletion prohibited), and D (deleted).

Also, as state transients representing transients between these states, nine state transients Ta to Ti are represented. For example, the state transient Ta represents a transient from a state SADA in which the sanitization is allowed and also the deletion is allowed to a state SPDP in which the sanitization is prohibited and also the deletion is prohibited.

The above-mentioned six states and nine state transients are not simply set as properties with respect to the partial documents but are physically set through a data holding method. With this configuration, the partial documents may be set in various states in accordance with disclosure, non-disclosure, and capability or incapability of revision, and it is possible to prevent information leakage of the electronic document caused by a false setting of the properties.

SUMMARY

According to an aspect of the invention, a method for generating a digital signature with respect to an electronic document, the method including: inputting a target electronic document and a corresponding digital signature σ; dividing the target electronic document into a plurality of partial documents mi; and when a revision of the partial documents of the electronic document is to be performed, in a case where deletion of the one partial document is to be performed, when sanitization is not prohibited, exponentiating the digital signature σ twice with a hash value Gi obtained by using the one partial document to be deleted and a hash function G, when sanitization is prohibited, exponentiating the digital signature with the hash value Gi, and eliminating the partial document to be deleted while taking the hash function G; in a case where sanitization of the one partial document is to be performed, replacing a part corresponding to the one partial document to be sanitized by the hash value Gi obtained by using the one partial document to be sanitized; in a case where deletion of the one partial document is to be prohibited, using a hash function H, which is identical to or different from the hash function G, and exponentiating the digital signature σ with a hash value Hi obtained by using the partial document whose deletion is to be prohibited; in a case where the sanitization of the one partial document is to be prohibited, exponentiating the digital signature σ with the hash value Gi obtained by using the one partial document whose sanitization is to be prohibited; and updating the digital signature σ.

It is to be understood that both the foregoing general description and the following detailed description are exemplary and explanatory and are not restrictive of the invention, as claimed.

BRIEF DESCRIPTION OF THE DRAWINGS

FIG. 7A is a first flow chart showing a procedure of the revision processing.

FIG. 7B is a second flow chart showing the procedure of the revision processing.

FIG. 7E is a fifth flow chart showing the procedure of the revision processing.

FIG. 7F is a sixth flow chart showing the procedure of the revision processing.

FIG. 7H is an eighth flow chart showing the procedure of the revision processing.

FIG. 9 shows seven states realized according to an embodiment.

FIG. 10 shows state transients according to an embodiment.

FIG. 16 shows partial document states and state transients in the related art.

DESCRIPTION OF EMBODIMENTS

According to the above-mentioned technology in the related art, a revision may not be performed to set a partial document in the state in which the sanitization is prohibited and also the deletion is allowed (SPDA). For this reason, in a case where a partial document exists in which the deletion is allowed but the sanitization is prohibited due to any reason, the partial document may not be set in the state in which the sanitization is prohibited and also the deletion is allowed. That is, a problem occurs that usability for the user is degraded in the related art.

Figure 17A:
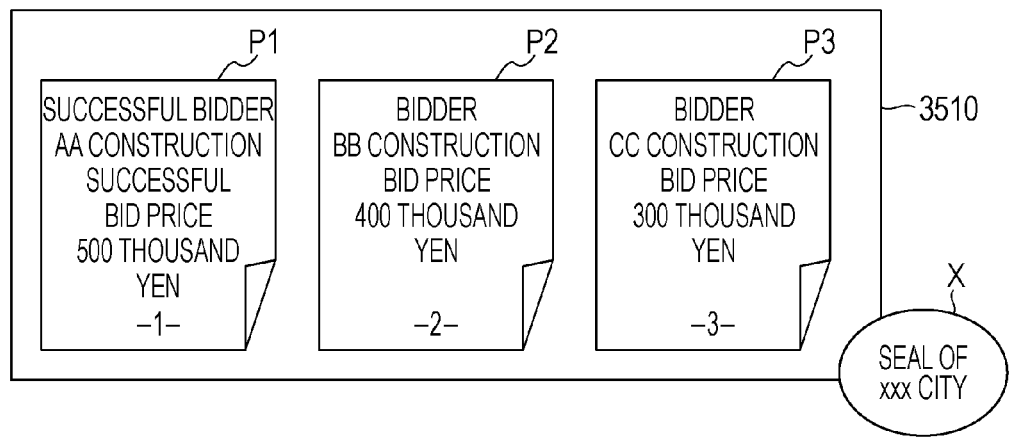
FIG. 17A is a first drawing showing a problem in a case where seven partial document states in the related art are not shown.
Figure 17B:
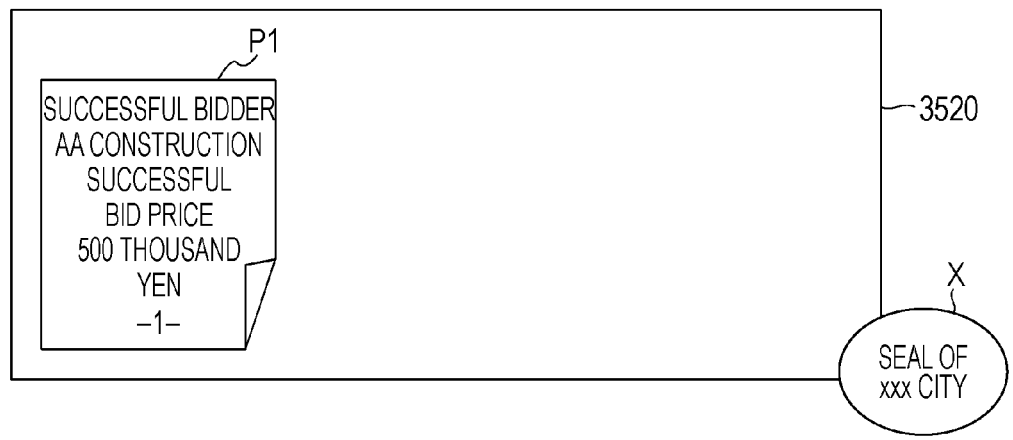
FIG. 17B is a second drawing showing a problem in a case where the seven partial document states in the related art are not shown.
Figure 17C:
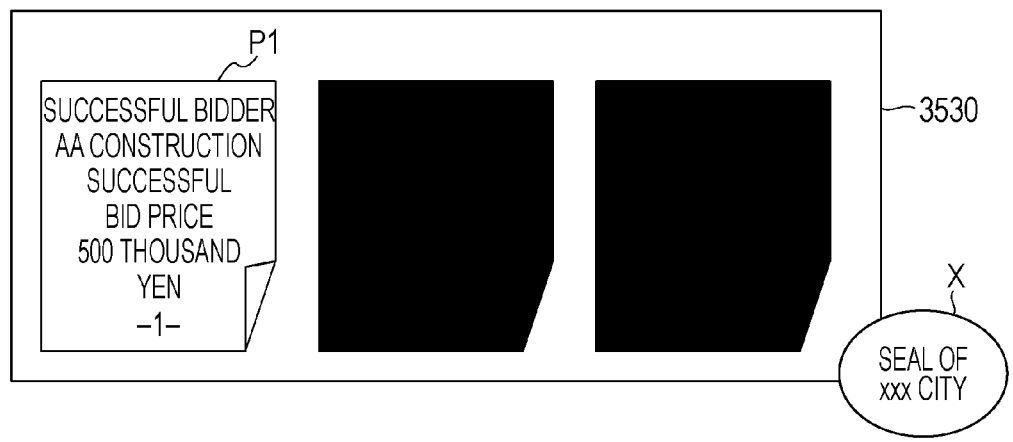
FIG. 17C is a third drawing showing a problem in a case where the seven partial document states in the related art are not shown.

Here, the problem in the related art, such as the one mentioned above, will be described. FIGS. 17A to 17C are explanatory diagrams showing examples of the problem in the related art. An original document 3510 shown in FIG. 17A is an electronic document indicating a bidding result for public works executed by xxx City. To be specific, on the first page, information including a final successful bidder name 'AA Construction' and a successful bid price '500 thousand yen' is described.

On the second page, information including a name of another bidder 'BB Construction' and a bid price '400 thousand yen' is described. On the third page, information including a name of another bidder 'CC Construction' and a bid price '300 thousand yen' is described. Also, the original document 3510 is attached with a digital signature X indicating an official seal of xxx City. At this time, respective pages 1 to 3 are set as partial document P1 to P3.

In a case a disclosure request on a bidding result exists, if the original document 3510 is disclosed to the public as it is, personal information such as names of bidders and bid prices described in the partial document P2 and the partial document P3 are disclosed. In such a case, while taking into account the personal information, partial sanitization on the original document 3510 is required.

In view of the above, by utilizing the sanitization and deletion signature technology, the original document 3510 is revised to realize the partial information sanitization. A revised document 3520 shown in FIG. 17B is an electronic document in which personal information having the confidentiality is deleted from the original document 3510. In a case where the revised document 3520 is disclosed to the public, the personal information having the confidentiality is deleted. For this reason, a viewer may not identify specific contents of the partial documents P2 and P3. That is, the personal information is appropriately protected, and the revised document 3520 is in a desirable state.

Also, a revised document 3530 shown in FIG. 17C is an electronic document in which the personal information having the confidentiality in the original document 3510 is sanitized. In a case where the revised document 3530 is disclosed to the public, the personal information having the confidentiality is sanitized. For this reason, the viewer may not identify specific contents of the partial documents P2 and P3. However, the confidentiality may not be guaranteed completely as the number of bidders may be estimated on the basis of the sanitized partial documents P2 and P3, for example. That is, the revised document 3530 may not be necessarily in a desirable state.

In order to avoid such a situation, at the time of creating the original document 3510, the partial documents P2 and P3 are set in a state in which the sanitization is prohibited and also the deletion is allowed (SPDA). In view of the above, a technology is demanded for preventing a choice of the sanitization so as to sanitize the partial documents P2 and P3.

In order to solve the problems in the above-mentioned prior art, the various embodiments of the present invention reduce the data amount for verifying the electronic document at the time of signing and revision. That is, the present technology holds one piece of digital signature data. With this configuration, a digital signature technology may be provided for securing the integrity of the digital signature.

(Preliminary Technology 1)

Hereinafter, a signature system according to a prior technology of the present invention will be described.

[Introduction of the RSA Accumulator into a Sanitization Signature]

First, the RSA accumulator is introduced into a part of a sanitization signature processing. This will be described by using FIGS. 12A and 12B. In the sanitization signature shown in FIGS. 12A and 12B, a signature is assigned on the hash value of the ID attached partial document. Thus, the signature is assigned on a value $h_1\|h_2\|h_3\|h_4$ in which the hash values $h_1$ to $h_4$ of the respective ID attached partial documents $M_1$ to $M_4$ are mutually concatenated. Here $\|$ represents concatenation. This is described as $\sigma=\text{Sign}(H(h_1\|h_2\|h_3\|h_4))$. When the hash values are concatenated and a signature is assigned, the integrity may be secured with respect to all the information on $h_1$ to $h_4$. However, as the $H(h_1\|h_2\|h_3\|h_4)$ part does not have the pseudo-commutative characteristic, for example, $H(h_1\|h_2\|h_3\|h_4)$ may not be generated from $H(h_1\|h_2\|h_3)$ and $h_4$. As $\text{Verify}(\sigma, H(h_1\|h_2\|h_3\|h_4))$ and $H(h_1\|h_2\|h_3\|h_4)$ are used for the signature verification, the signature verification may not be performed from $H(h_1\|h_2\|h_3)$ and $h_4$.

In view of the above, the RSA accumulator is introduced into this part. Instead of $H(h_1\|h_2\|h_3\|h_4)$, $g^{h1 \times h2 \times h3 \times h4} \mod N$ is used. The signature becomes $\sigma=\text{Sign}(g^{h1 \times h2 \times h3 \times h4} \mod N)$. By doing this, from the pseudo-commutative characteristic of the RSA accumulator, $(g^{h1 \times h2 \times h3} \mod N)^{h4} \mod N = g^{h1 \times h2 \times h3 \times h4} \mod N$ is established. Therefore, the signature verification $\text{Verify}(\sigma, g^{h1 \times h2 \times h3 \times h4} \mod N)$ may be performed from $(g^{h1 \times h2 \times h3} \mod N)$ and $h_4$.

[Introduction of a Deletion Signature]

By simply changing the concatenation of the hash values into the RSA accumulator, the information amount may not be reduced. A deletion signature is introduced for reducing the information amount. In order to distinguish the signatures, the signature for the RSA accumulator is set as s=mod N). Then, the signature for the deletion is set as t, and the two signatures s and t are correctively referred to as signature $\sigma=(s, t)$.

Figure 18A:
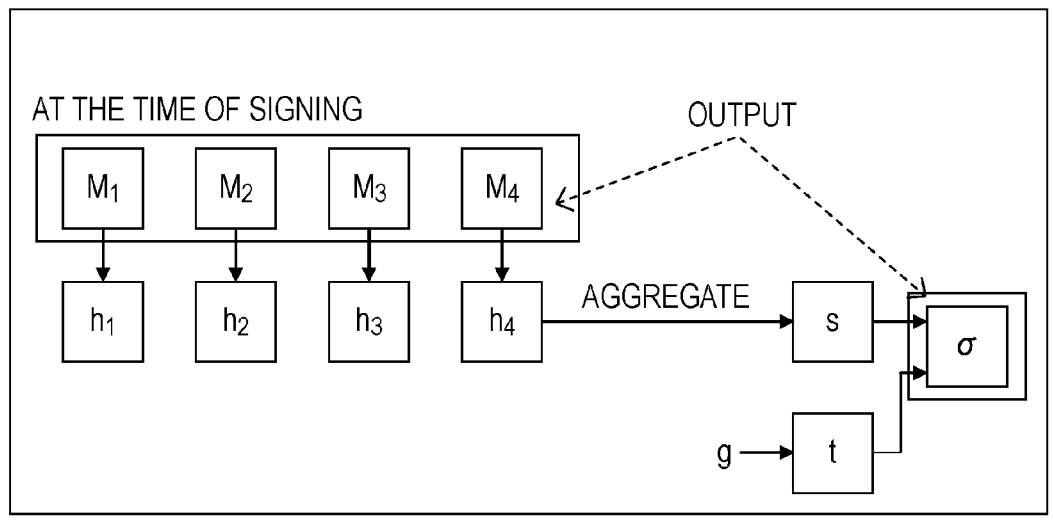
FIG. 18A is a first drawing showing a concept of a signature system according to a prior technology 1.
Figure 18B:
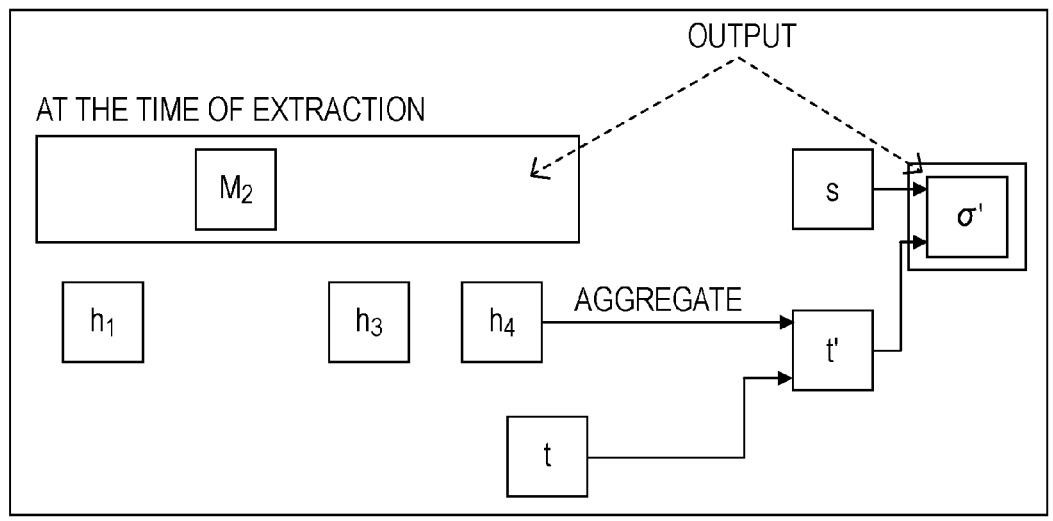
FIG. 18B is a second drawing showing the concept of the signature system according to the prior technology 1.

FIGS. 18A and 18B shows a concept of the digital signature according to the prior technology 1.

Figure 12A:
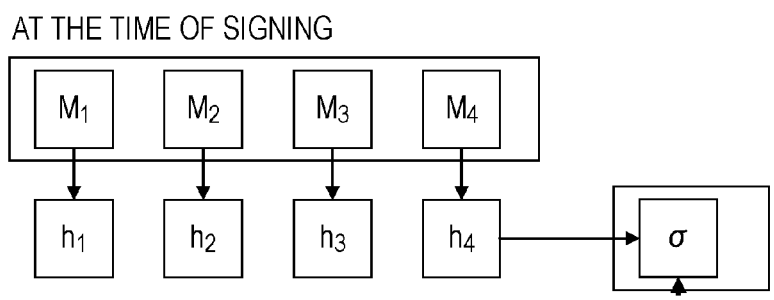
FIG. 12A is a first drawing showing a problem in a sanitization signature system in a prior art.

As shown in FIG. 18A, the signer creates the ID attached partial documents $M_1$ to $M_4$ similarly as in the sanitization signature of FIG. 12A to create individual partial hash values $h_1$ to $h_4$. By using the RSA accumulator, these hash values $h_1$ to $h_4$ are aggregated to calculate $s=\text{sign}(g^{h1 \times h2 \times h3 \times h4} \mod N)$. Then, t=g is set as an initial value of the signature for the deletion to output the signature $\sigma=(s, t)$.

Figure 12B:
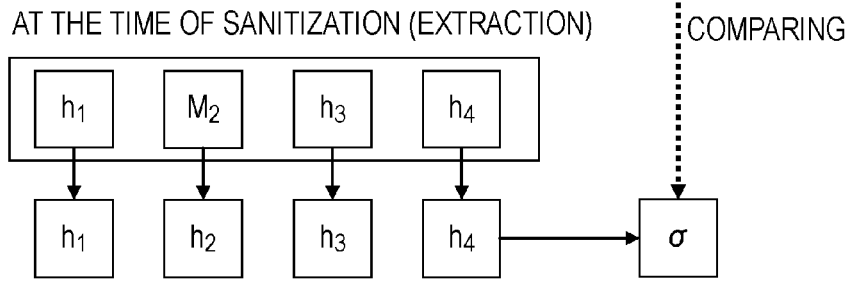
FIG. 12B is a second drawing showing a problem in the sanitization signature system in the prior art.
Figure 13A:
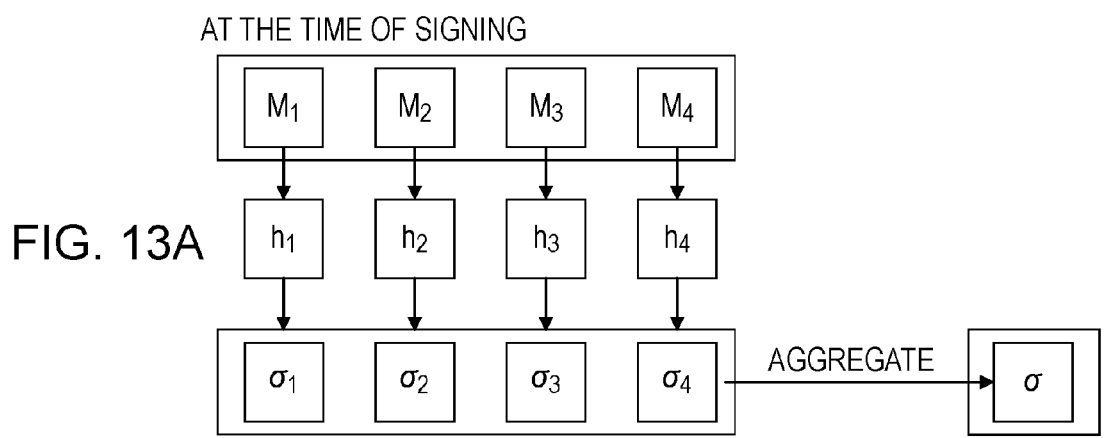
FIG. 13A is a first drawing showing a problem in a deletion signature system in the prior art.
Figure 13B:
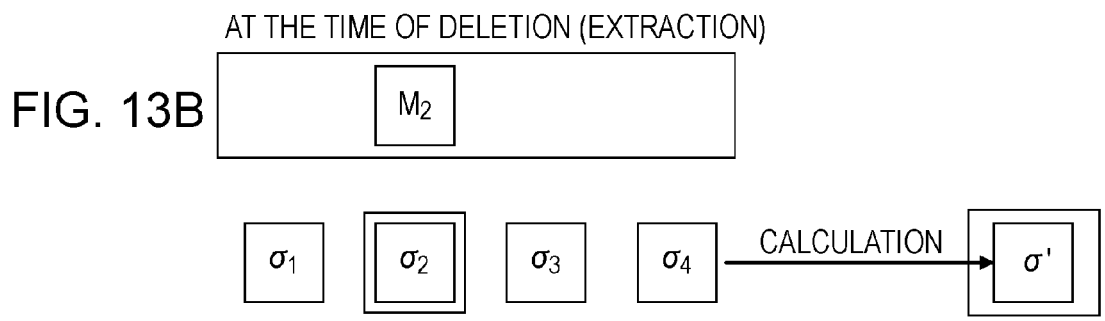
FIG. 13B is a second drawing showing a problem in the deletion signature system in the prior art.
Figure 14:
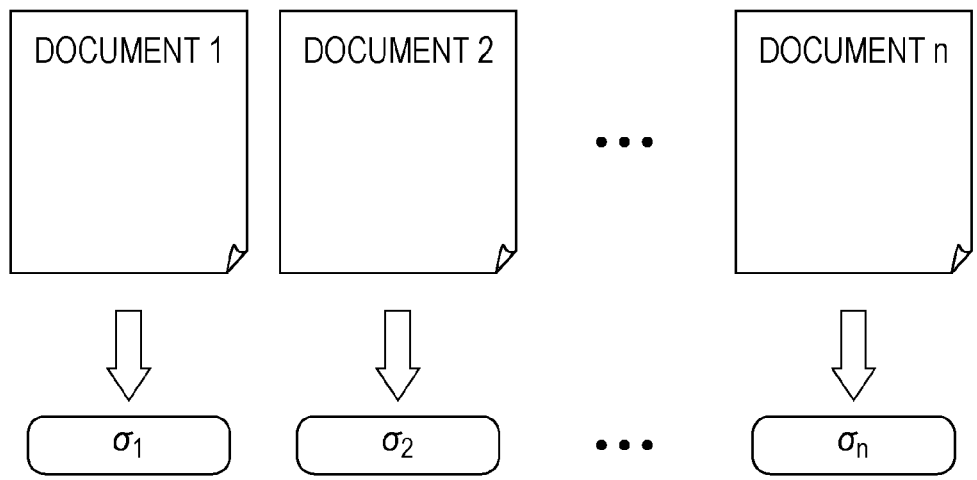
FIG. 14 schematically shows a concept of a normal digital signature.
Figure 15:
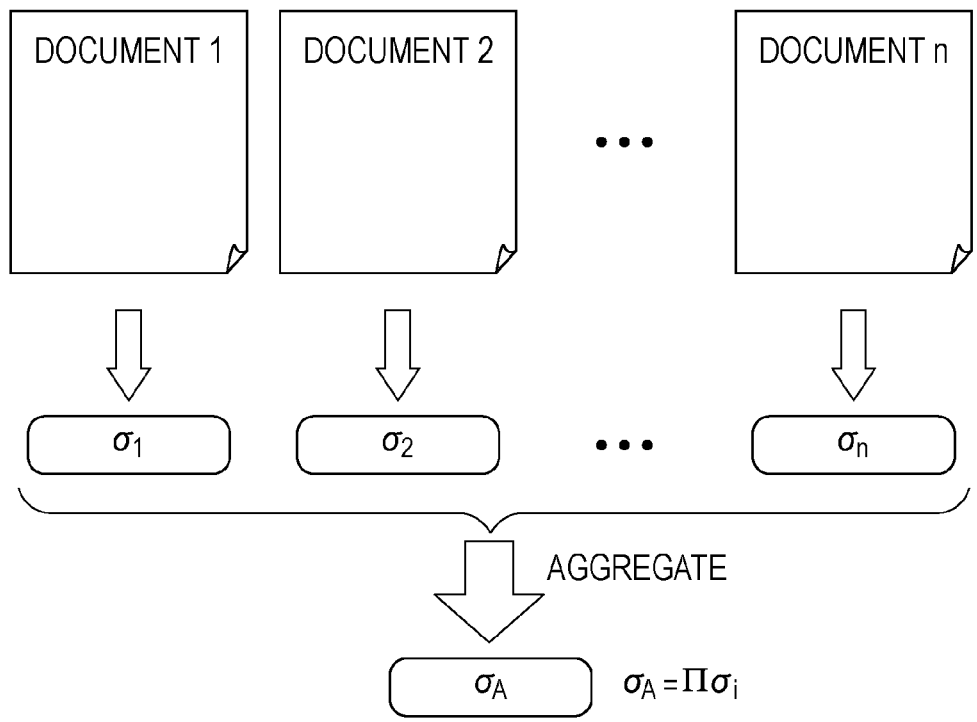
FIG. 15 schematically shows a concept of an aggregate signature.

As shown in FIG. 18B, the extractor calculates the hash values $h_1$, $h_3$, and $h_4$ of the ID attached partial documents $M_1$, $M_3$, and $M_4$ to be deleted (not to be extracted) similarly as in the sanitization signature of FIG. 12B. Then, the signature t for the deletion is updated to $t'=t^{h1 \times h3 \times h4} \mod N$ to disclose $\sigma'=(s, t')$ to the public together with the ID attached partial document $M_2$. The verifier calculates the hash value $h_2$ from the public $M_2$ and performs a verification by using the following expression from $\sigma'=(s, t')$ and $h_2$. $\text{Verify}(s, t'^{h2} \mod N)=\text{Verify}(s, g^{h1 \times h2 \times h3 \times h4} \mod N)$ Through the aggregation to the deletion signature using the RSA accumulator in this manner, it is possible to significantly reduce the hash value holding at the timing of the sanitization which is a problem in the sanitization signature. At this time, arbitrary signature algorithm may be used for Sign and Verify.

In this way, according to the prior technology 1, the two signatures (s, t) are held. The signature t is obtained by initialization by utilizing random numbers ($t=g^r$). A signature s is obtained by applying a general digital signature on one obtained by exponentiating the initial value of the signature t with all the hash values of the respective partial documents ($s=\text{Sig}(t^{\Pi hi})$). In a case where the partial document is deleted, the signature t is exponentiated with the hash value of the partial document to be deleted (t→$t^{hi}$), and the partial document to be deleted is eliminated (mi→x). On the other hand, in a case where the sanitization is performed on the partial document, the partial document is replaced with the hash value thereof (mi→hi, hi=H(mi)).

However, according to the above-mentioned prior technology 1, in a chart 600 of FIG. 19 which will be described below, it is possible to only realize three states including SADA, SDA, and D and three state transients T5, T6, and T12.

(Preliminary Technology 2)

In view of the above, a prior technology 2 is proposed.

At this time, the respective component making up an electronic document M has various states identified by a combination among the component and a first digital signature and a second digital signature which are prescribed by the component. To be specific, the component is in one of a state SADA (in which the sanitization is allowed and also the deletion is allowed), the state SPDA (in which the sanitization is prohibited and also the deletion is allowed), the state SPDP (in which the sanitization is prohibited and also the deletion is prohibited), the state SADP (in which the sanitization is allowed and also the deletion is prohibited), the state SDA (in which the document is sanitized and the deletion is allowed), the state SDP (in which the document is sanitized and also the deletion is prohibited), the state D (in which the document is deleted).

For example, in a case where a certain component is in the state SADA (in which the sanitization is allowed and also the deletion is allowed), the reviser may arbitrarily sanitize or delete this component. Herein, the sanitization puts the component in a state, for example, in which the component may not be recognized by the viewer by applying a sanitization processing or the like. The deletion puts the component in a state in which the existence of the component may not be grasped by the viewer.

With the electronic document management apparatus according to the prior technology 2, while the electronic document M is held so that the authenticity of the electronic document M may be verified, the revision may be performed to put the component making up the electronic document M in the state SPDA (in which the sanitization is prohibited and also the deletion is allowed). Furthermore, the component set in the state SPDA (in which the sanitization is prohibited and also the deletion is allowed) may be set in the state SPDP (in which the sanitization is prohibited and also the deletion is prohibited) or the state D (in which the component is deleted).

Here, the states and the state transients of the respective partial documents making up the electronic document M are described. FIG. 19 is a chart representing the partial document states and the state transients. It should be noted that the partial document is equivalent to the above-mentioned component making up the electronic document.

Figure 19:
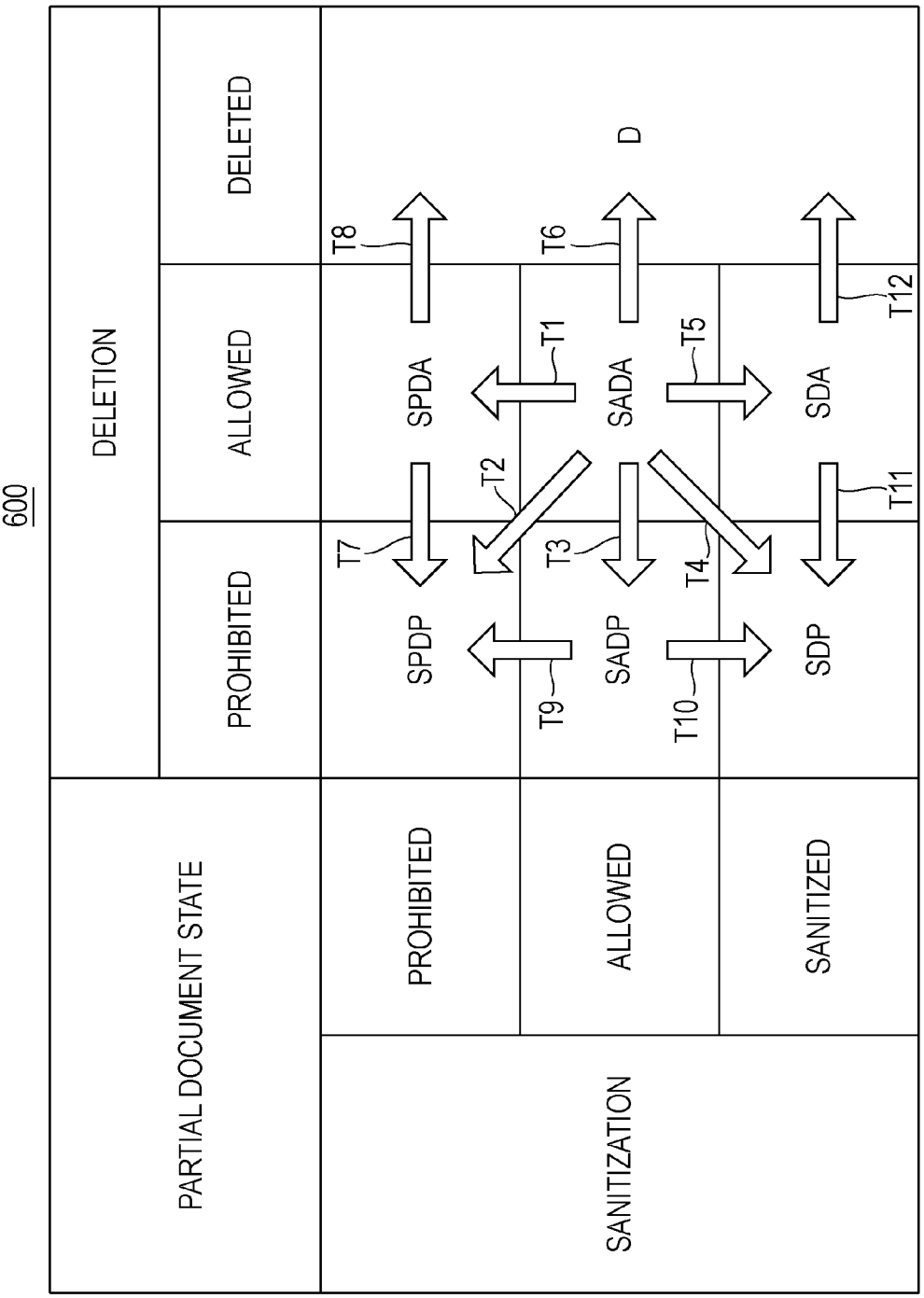
FIG. 19 shows partial document states and state transients according to a prior technology 2.

In FIG. 19, the chart 600 represents the states of the partial documents which may be set in the respective partial documents making up the electronic document M. At this time, a state in which the sanitization is allowed and also the deletion is allowed is denoted by "SADA", a state in which the sanitization is prohibited and also the deletion is allowed is denoted by "SPDA", a state in which the sanitization is prohibited and also the deletion is prohibited is denoted by "SPDP", a state in which the sanitization is allowed and also the deletion is prohibited is denoted by "SADP", a state in which the document is sanitized and also the deletion is allowed is denoted by "SDA", a state in which the document is sanitized and also the deletion is prohibited is denoted by "SDP", and a state in which the partial document is deleted is denoted by "D".

In addition, the chart 600 represents 12 state transients T1 to T12 as a transient between states. When the revision is performed on the respective partial documents by the reviser, T1 to T12 represent the state transients where the state of the respective partial documents may be set into another state.

At this time, when the state transient T1 is taken as an example, the state transient T1 represents the transient from "SADA" which is the state in which the sanitization is allowed and also the deletion is allowed to "SPDA" which is the state in which the sanitization is prohibited and also the deletion is allowed. In addition, when the state transient T7 is taken as an example, the state transient T7 represents the transient from "SPDA" which is the state in which the sanitization is prohibited and also the deletion is allowed to "SPDP" which is the state in which the sanitization is prohibited and also the deletion is prohibited.

In this way, according to the prior technology 2, the electronic document is obtained which is composed of a plurality of components (partial documents) where the first digital signature and the second digital signature unique to the relevant component are prescribed for each of the components and also with which the aggregation digital signature obtained by aggregating the respective first digital signatures is associated. Then, in a case where a specification of a component which becomes a sanitization prohibit target in the electronic document is accepted and the component specified as the sanitization prohibit target and both the first digital signature and the second digital signature prescribed for the relevant component exist, it is judged that the relevant component is in the state in which the sanitization is allowed and also the deletion is allowed. Then, in a case where it is judged that the component is in the state in which the sanitization is allowed and also the deletion is allowed, the second digital signature prescribed for the component which becomes the sanitization prohibit target is deleted (the state transient SADA→SPDA in FIG. 19).

Also, in a case where the specification of the component which becomes the deletion prohibit target in the electronic document is accepted and it is judged that the component specified as the deletion prohibit target and the first digital signature prescribed for the relevant component exist, it is judged that the relevant component is in the state in which the deletion is allowed, and in a case where it is judged that the relevant component is in the state in which the deletion is allowed, the first digital signature prescribed for the component which becomes the deletion prohibit target may be deleted (the state transient SPDA→SPDP in FIG. 19).

In a case where the specification of the component which becomes the deletion prohibit target in the electronic document is accepted and it is judged that the component specified as the deletion prohibit target and the first digital signature prescribed for the relevant component exist, it is judged that the relevant component is in the state in which the deletion is allowed. Then, in a case where it is judged that the relevant component is in the state in which the deletion is allowed, the first digital signature prescribed for the component which becomes the deletion prohibit target may be deleted (the state transient SPDA→SPDP in FIG. 19).

Furthermore, according to the prior technology 2, the component making up the digital signature may be set from the state in which the sanitization is allowed and also the deletion is allowed to the state in which the sanitization is prohibited and also the deletion is allowed. Furthermore, the component set in the state in which the sanitization is prohibited and also the deletion is allowed may be set in the state in which the sanitization is prohibited and also the deletion is allowed or the state in which the partial document is deleted.

Figure 20:
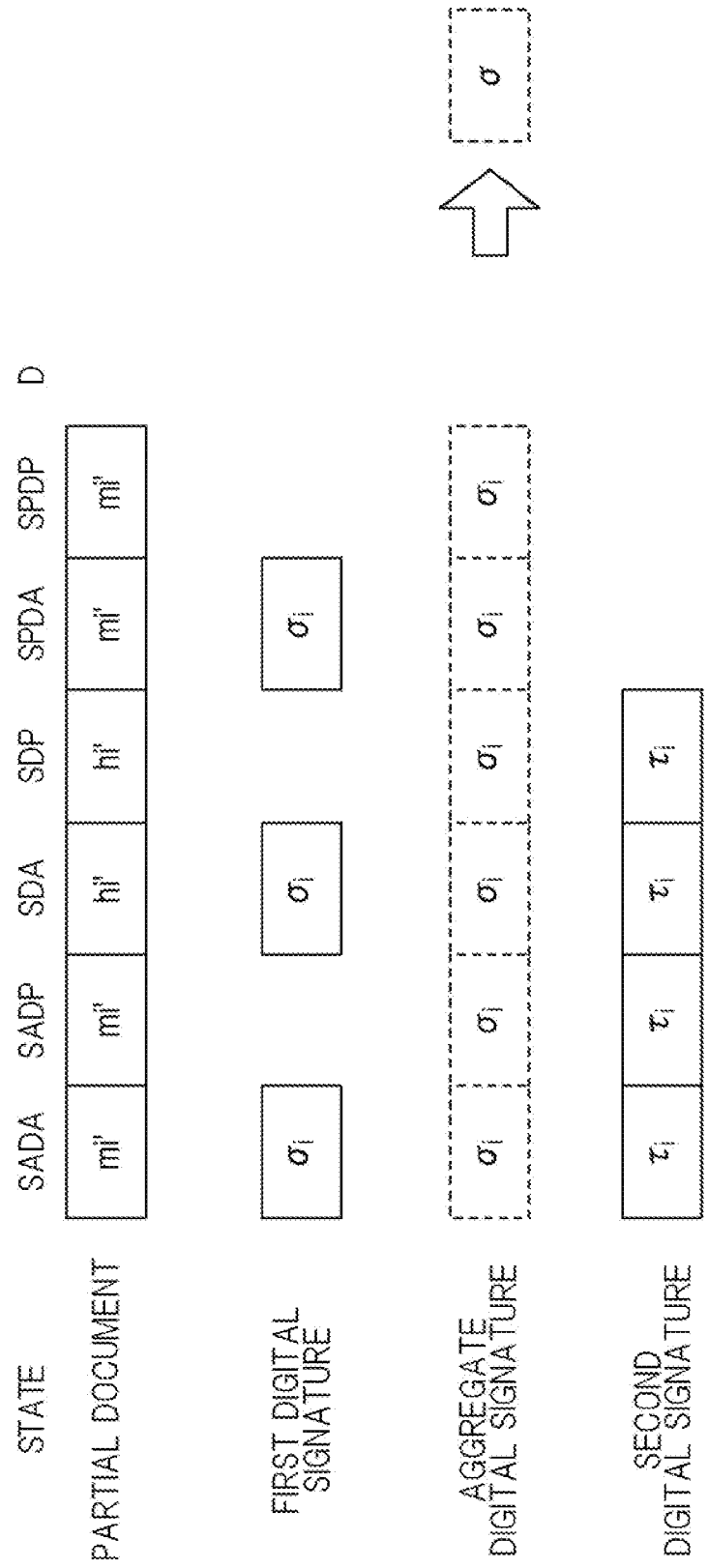
FIG. 20 is an explanatory diagram showing a representation system of the partial document states according to the prior technology 2.

Similarly, the seven states and the 12 state transients of the component shown in FIG. 19 may be represented by the states of the first digital signature, the second digital signature, and the aggregation digital signature as shown in FIG. 20.

According to the prior technology 2, a revised document is obtained in which the component which becomes a revision target is revised into the state in which the sanitization is prohibited, the deletion is prohibited, or the component is deleted. On the basis of the first digital signature, the second digital signature, and the aggregation digital signature, the authenticity of the revised document is verified, and a result of the verification is output. Then, even in a case where the state of the component specified as the revision target is set as the state in which the sanitization is prohibited, the deletion is prohibited, or the component is deleted, the authenticity of the revised document including the revision target may be verified.

On the other hand, according to the prior technology 2, the data amount to be managed becomes enormous. For example, in a case where a document composed of 1000 pages is under the above-mentioned state management for each page, total 2002 pieces of digital signature information including 1000 pieces of the first indivisual signatures, 1000 pieces of the second indivisual signatures, one piece of the first aggregation digital signature, and one piece of the second aggregation digital signature needs to be held. That is, when the number of the partial documents is n, 2n+2 pieces of signature information needs to be held. If a detailed control in units of one character is desired to be executed on this document, the number of the partial documents is increased several hundred folds, and accordingly the signature information amount is also increased several hundred folds. Furthermore, in a case where such a detailed control is performed, the information amount of the target partial document becomes smaller, but the signature information amount per one piece is not changed. For that reason, in a case where the detailed control is performed, a problem also occurs that the signature information amount becomes larger than the original document.

(Preliminary Technology 3)

In view of the above, a prior technology 3 is proposed. With the prior technology 3, the target electronic document is divided into a plurality of partial documents mi and the signature s which is the signature for the electronic document and the signature t for the revision of the partial document are generated. At this time, while the signature t is initialized, the signature s applies the digital signature on one obtained by exponentiating the signature t with all the hash values of the respective partial documents twice ($s=Sig(t^{\Pi hihi})$). At the time of the revision on the partial document, in a case where the partial document is deleted, except for a case where the sanitization is prohibited, the signature t is exponentiated twice by the hash value of the partial document to be deleted ($t \rightarrow t^{hihi}$). In a case where the sanitization is prohibited, signature t is exponentiated by the hash value of the partial document to be deleted. In either case too, the partial document to be deleted is eliminated. In a case where the sanitization is performed on the partial document, the partial document is replaced by the hash value thereof (mi→hi). In a case where the deletion of the partial document is prohibited, the signature t is exponentiated by a value obtained by subjecting the partial document whose deletion is prohibited to the hash function twice ($di=H(H(mi)))(t \rightarrow t^{di}$). In a case where the sanitization of the partial document is prohibited, the signature t is exponentiated by the hash value of the partial document whose sanitization is prohibited ($t \rightarrow t^{hi}$) to update the signature t.

To be more specific, for example, when the state of the partial document is the state in which the sanitization is allowed and the deletion is allowed, a case of the signature t for the revision and the state of the partial document mi will be considered. In a case where the partial document is revised into the state in which the sanitization is prohibited and the deletion is allowed, the signature t is revised into $t^{hi}$, and the state of the partial document mi is unchanged. In a case where the partial document is revised into the state in which the sanitization is allowed and the deletion is allowed, the signature t is revised into $t^{di}$, and the state of the partial document mi is unchanged. In a case where the partial document is revised into the state in which the sanitization is prohibited and the deletion is prohibited, the signature t is revised into $t^{hidi}$, and the state of the partial document mi is unchanged. In a case where the partial document is revised into the state in which the partial document is sanitized and the deletion is allowed, the signature t is unchanged, and the state of the partial document mi is revised into hi. In a case where the partial document is revised into the state in which the partial document is sanitized and the deletion is prohibited, the signature t is revised into $t^{di}$, and the state of the partial document mi is revised into hi. In a case where the partial document is revised into the state in which the partial document is deleted, the signature t is revised into $t^{hihi}$, and the state of the partial document mi is deleted.

In this case, a state setting is performed on the respective partial documents for judging on which state the partial document is in. Also, at the time of the verification, a recovery system is adopted, and on the basis of this state setting, t in the initial state is similarly updated from the partial document. With this configuration, it is verified whether or not the document revision is rightly performed.

Figure 21:
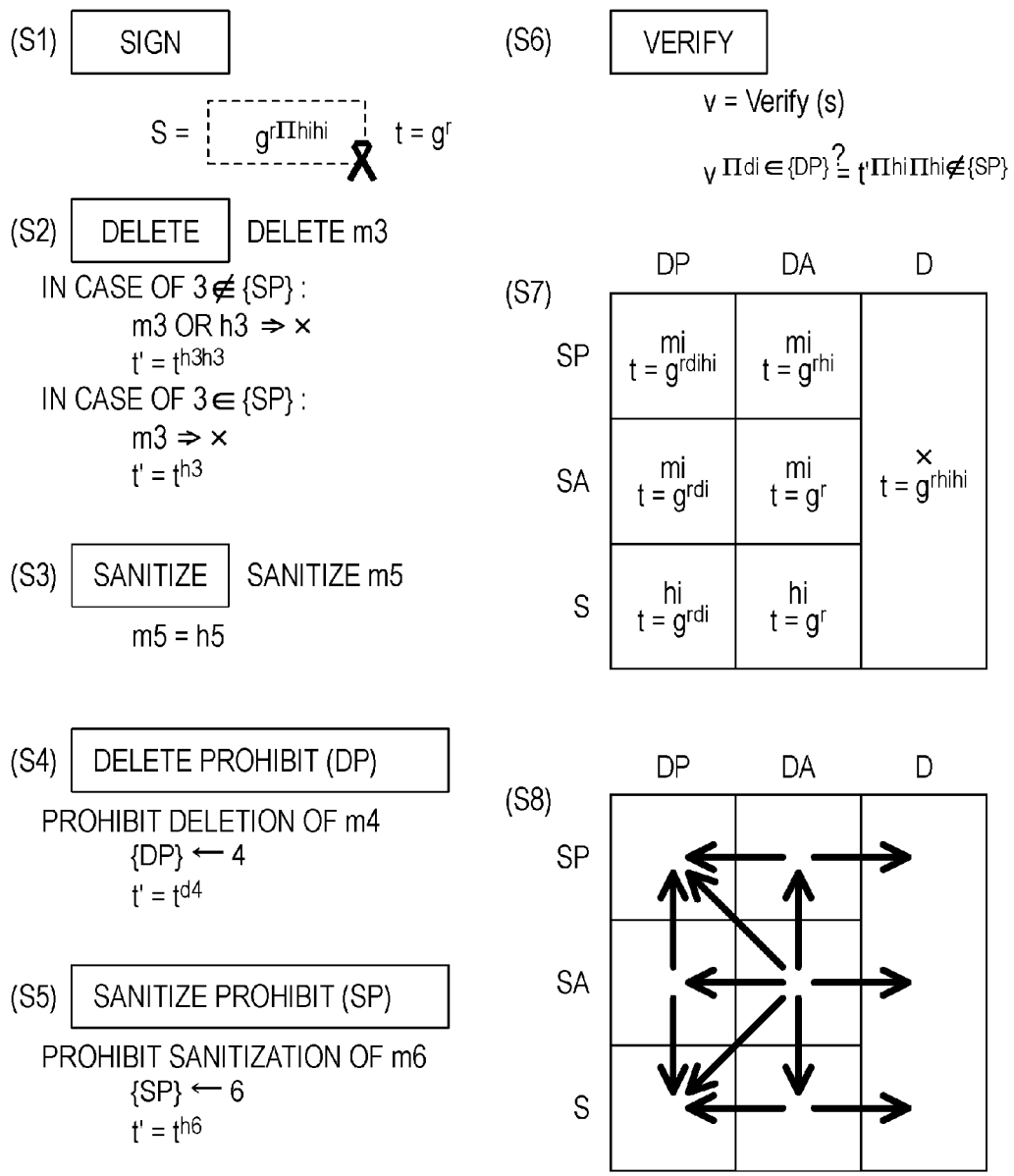
FIG. 21 is a conceptual diagram showing a concept of an embodiment.

FIG. 21 shows a concept of the above-mentioned prior technology 3.

That is, in FIG. 21, in S1, the target electronic document is divided into a plurality of partial documents mi and the signature s which is the signature for the electronic document and the signature t for the revision of the partial document are generated. At this time, while the signature t is initialized, the signature s applies the digital signature on one obtained by exponentiating the signature t with all the hash values of the respective partial documents twice ($s=t^{\Pi hihi}$).

Also, in S2, in a case where the partial document m3 is deleted or a case where the sanitized part (the hash value h3 replaced into the hash value) is deleted, except for a case where the sanitization is prohibited, the signature t is exponentiated twice by the hash value of the document of the part to be deleted ($t \rightarrow t'=t^{h3h3}$). Also, in a case where the sanitization is prohibited, the signature t is exponentiated by the hash value of the partial document to be deleted ($t \rightarrow t^{h3}$). In either case, the partial document (m3) or the hash value (h3) is eliminated.

Also, in S3, in a case where the sanitization of the partial document m5 is performed, the partial document is replaced by the hash value thereof (m5→h5).

Also, in S4, in a case where the deletion of the partial document m4 is prohibited, the signature t is exponentiated by a value obtaining by subjecting the partial document whose deletion is prohibited to the hash function twice ($di=H(H(mi)))(t \rightarrow t^{d4}$).

Also, in S5, in a case where the sanitization of the partial document m6 is prohibited, the signature t is exponentiated by the hash value of the partial document whose deletion is prohibited (t→$t^{h4}$).

In the above-mentioned manner, the signature t is updated. Then, at the time of the verification, for example, as shown in S6, while v=Verify(s) is set, the verification is performed by comparing a value of $v^{\Pi di}$ related to the partial document whose deletion is prohibited with a value of $t^{\Pi hi \Pi hi}$ related to the partial document whose sanitization is not prohibited.

As is apparent from the above description, according to the prior technology 3, the partial document may be set in the state in which the sanitization is prohibited and also the deletion is allowed, and also the signature information amount is not proportionate to the number of the partial documents and may be regularly realized by the two pieces (s, t). With this configuration, such effects are attained that the more flexible revision on the electronic document is realized, and the usability for the user may be improved. That is, according to the prior technology 3, by holding the two pieces of data (s, t), the above-mentioned seven states and the 12 state transients may be realized by the signature information amount which is not proportionate to the number of the partial documents.

However, according to the above-mentioned prior technology 3 too, the two pieces of data are held. If the data to be held may be reduced to one piece, the data holding amount may be minimized. Hereinafter, the reduction in the data amount realized will be described.

(System Configuration of an Electronic Document Management System 100)

Figure 1:
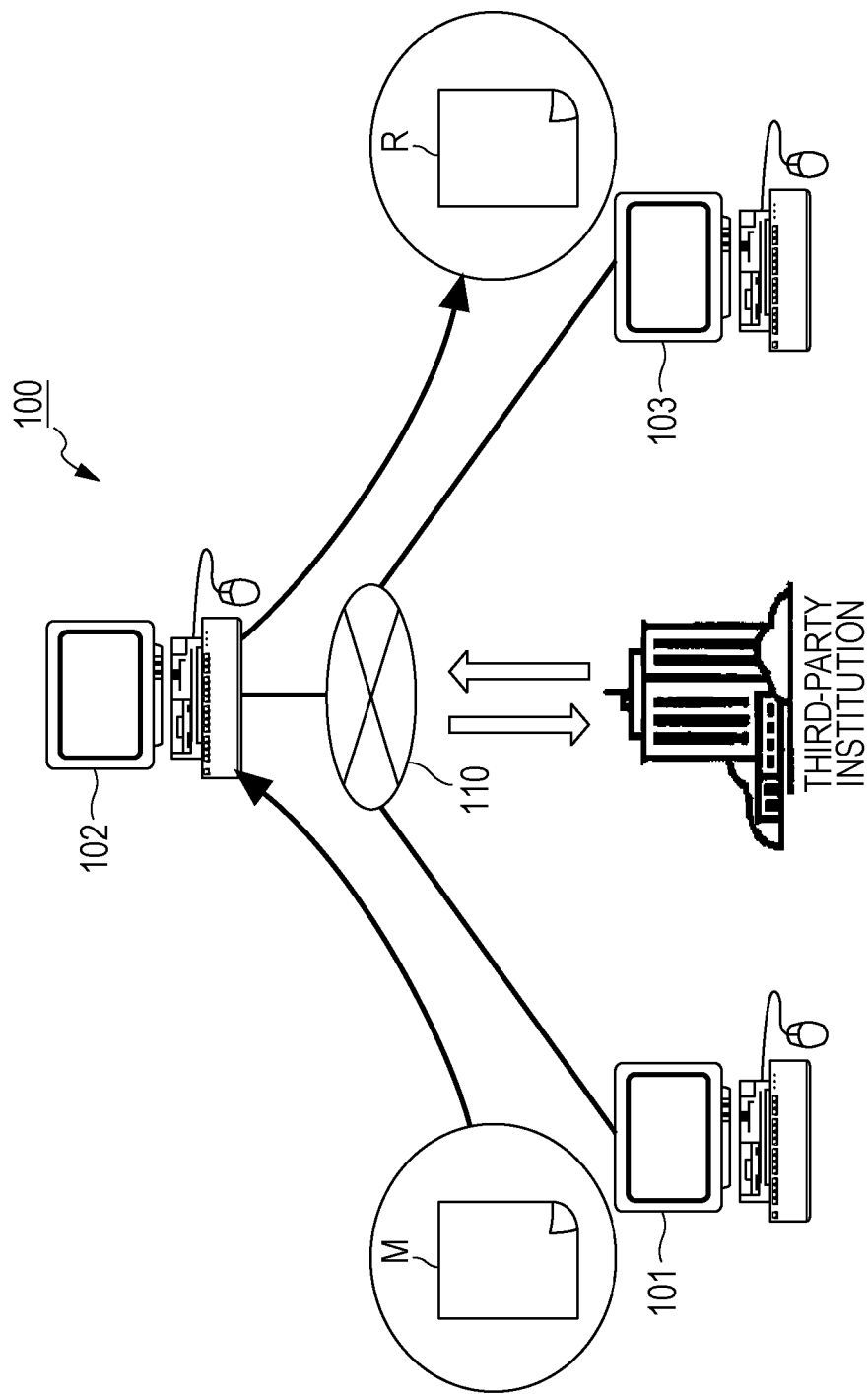
FIG. 1 is an overall system configuration diagram according to an embodiment.

Hereinafter, a system configuration of a digital signature apparatus (electronic document management system) according to an embodiment will be described. FIG. 1 is a system configuration diagram of the electronic document management system according to an embodiment.

In FIG. 1, in an electronic document management system 100, a plurality of electronic document management apparatuses 101, 102, and 103 (in FIG. 1, three apparatuses) are mutually connected in a communicable manner via a network 110 such as the internet, a LAN, or a WAN.

The electronic document management apparatus 101 is a computer apparatus used by the signer who applies a digital signature on the electronic document M. The signer uses the electronic document management apparatus 101 so that it is possible to apply the digital signature for securing the authenticity on the electronic document M. To be specific, the electronic document management apparatus 101 assigns the digital signature generated by using a private key of the signer on the electronic document M.

The electronic document M is information having the confidentiality such as an electronic family register issued from a governmental institution, an electronic medical record issued from a medical institution, and a grade report issued from an educational institution. Also, the electronic document M may be an official document and the like whose disclosure may be requested to a governmental institution of the respective local authorities.

The electronic document management apparatus 102 is a computer apparatus used by the reviser who revises the electronic document M assigned with the digital signature. The reviser uses the electronic document management apparatus 102 to change (update) the state of one or more of the partial documents making up the electronic document M, so that a revised document R may be created. At this time, the electronic document management apparatus 102 may add the revision state indicating into which state a partial document is revised while corresponding to the partial document.

The electronic document management apparatus 103 is a computer apparatus used by the verifier who verifies the authenticity of the revised document R. The verifier utilizes the electronic document management apparatus 103, so that it is possible to verify the authenticity of the revised document R. At this time, the electronic document management apparatus 103 uses a public key issued from a third-party institution to verify the authenticity of the revised document R.

It should be noted that the computer apparatuses used by the signer, the reviser, and the verifier are respectively set as the electronic document management apparatuses 101, 102, and 103, but the configuration is not limited to the above. For example, by using one computer apparatus (for example, the electronic document management apparatus 101), signing, revision, and verification may be performed. Also, the revision on the electronic document M may be additionally performed by a plurality of revisers.

Here, a series of flow for the signing, revision, and verification of the electronic document M is described. First, in the electronic document management apparatus 101, a digital signature is assigned on the electronic document M by the signer. After that, in the electronic document management apparatus 102, any revision is performed on the electronic document M assigned with the digital signature. Then, in accordance with the disclosure request or the like by the verifier, the revised document R is sent from the electronic document management apparatus 102 to the electronic document management apparatus 103. In the electronic document management apparatus 103, the authenticity of the revised document R is verified.

For example, a case will be considered that disclosure of an official document related to an environmental pollution issue is requested to the electronic document management apparatus 102 installed in a certain governmental institution of a local authority by utilizing the electronic document management apparatus 103. As a result, the user for the electronic document management apparatus 103 may obtain the official document related to the environmental pollution issue and view the official document.

At this time, a staff member of the governmental institution utilizes the electronic document management apparatus 102 so that it is possible to set various attributes with respect to contents described in the official document to be disclosed. For example, the official document created and signed by the electronic document management apparatus 101 is set as a document to be forcedly disclosed with regard to current situations on aerial pollution and water contamination which are obliged to be disclosed. Also, names of casualties who actually suffer from a damage by the environmental pollution may be set as a sanitized document, and furthermore, parts where addresses of the casualties may be set as a document to be deleted.

In this way, the user for the electronic document management apparatus 103 may set various attributes with respect to arbitrary documents in the official document to be disclosed. Also, the authenticity of the official document where an alteration such as setting of various attributes is performed may be verified, for example, by the electronic document management apparatus 103, and it is possible to verify whether or not an unauthorized alteration is conducted.

[Hardware Configuration of the Electronic Document Management Apparatus]

Figure 2:
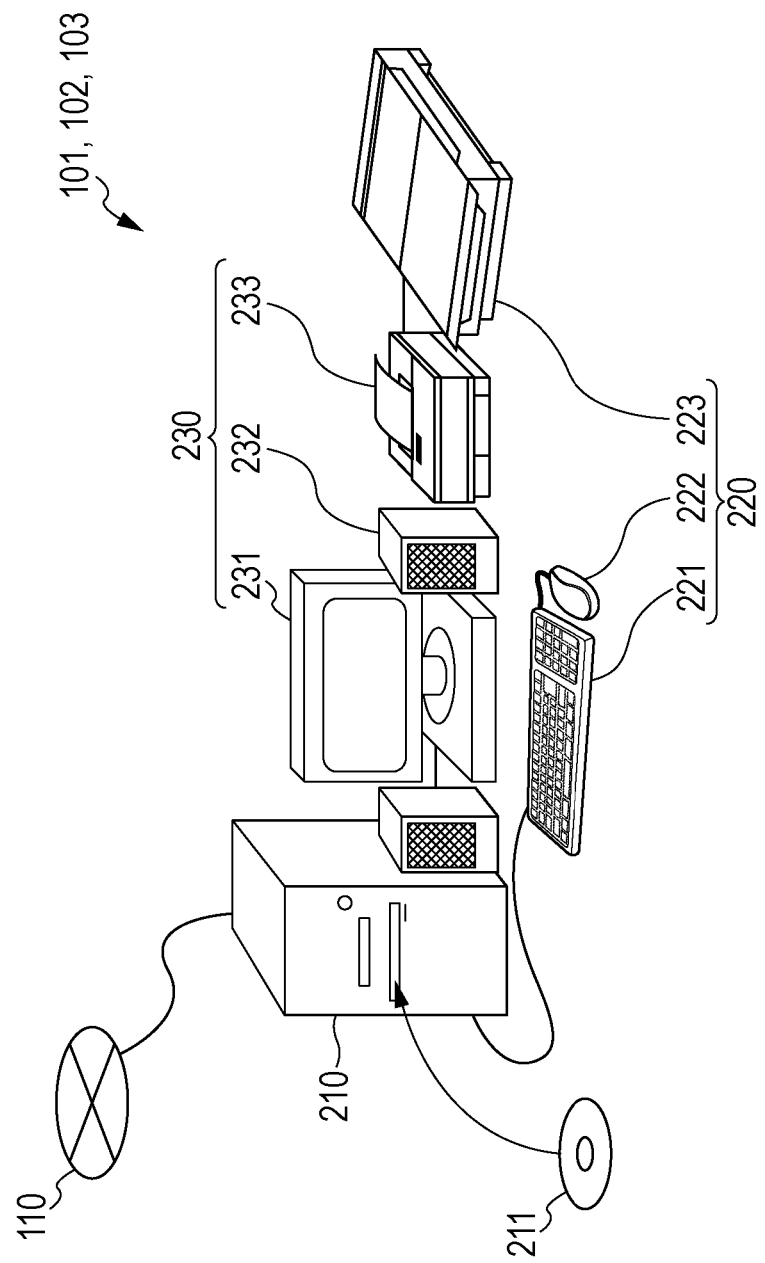
FIG. 2 is an explanatory diagram for describing a hardware configuration of an electronic document management apparatus according to an embodiment.

First, hardware configurations of the electronic document management apparatuses 101, 102, and 103 according to an embodiment will be described. These hardware configurations are mutually common, and therefore hereinafter, the hardware configuration of the electronic document management apparatus 101 will be described. FIG. 2 is an explanatory diagram for describing a hardware configuration of the electronic document management apparatus according to an embodiment of this invention.

In FIG. 2, the electronic document management apparatus 101 is provided with a computer main body 210, an input apparatus 220, and an output apparatus 230. Also, the electronic document management apparatus 101 may be connected via a router or modem (not shown) to the network 110 such as a LAN, a WAN, or the internet.

The computer main body 210 has a CPU, a memory, and an interface. The CPU governs an overall control on the electronic document management apparatus 101. The memory is provided with all or a part of a ROM, a RAM, an HD, an optical disk 211, and a flash memory. The memory is used as a work area of the CPU.

Also, the memory stores various programs, and the program is loaded from a command from the CPU. The HD and the optical disk 211 are controlled on the basis of read/write of data through a disk drive. Also, the optical disk 211 and the flash memory may be freely detachably attached to the computer main body 210. The interface performs a control on an input from the input apparatus 220, an output to the output apparatus 230, and sending and reception with respect to the network 110.

Also, the input apparatus 220 includes a key board 221, a mouse 222, a scanner 223, or the like. The key board 221 is provided with keys for inputting characters, numerals, various instructions, and the like and is used for performing data input. Also, the key board 221 may also be of a touch panel system. The mouse 222 is used for performing a cursor movement, a range selection, a window movement, a size change, and the like. The scanner 223 optically reads an image. The read image is taken in as image data to be stored in the memory in the computer main body 210. It should be noted that the scanner 223 may have an OCR function.

Also, the output apparatus 230 includes a display 231, a speaker 232, a printer 233, or the like. The display 231 displays not only a cursor, an icon, or a tool box but also data such as a document, an image, and function information. Also, the speaker 232 outputs audio such as sound effects and reading voice. Also, the printer 233 prints image data and document data.

[The Electronic Document Management Apparatus 101 for the Signer]

Figure 3:
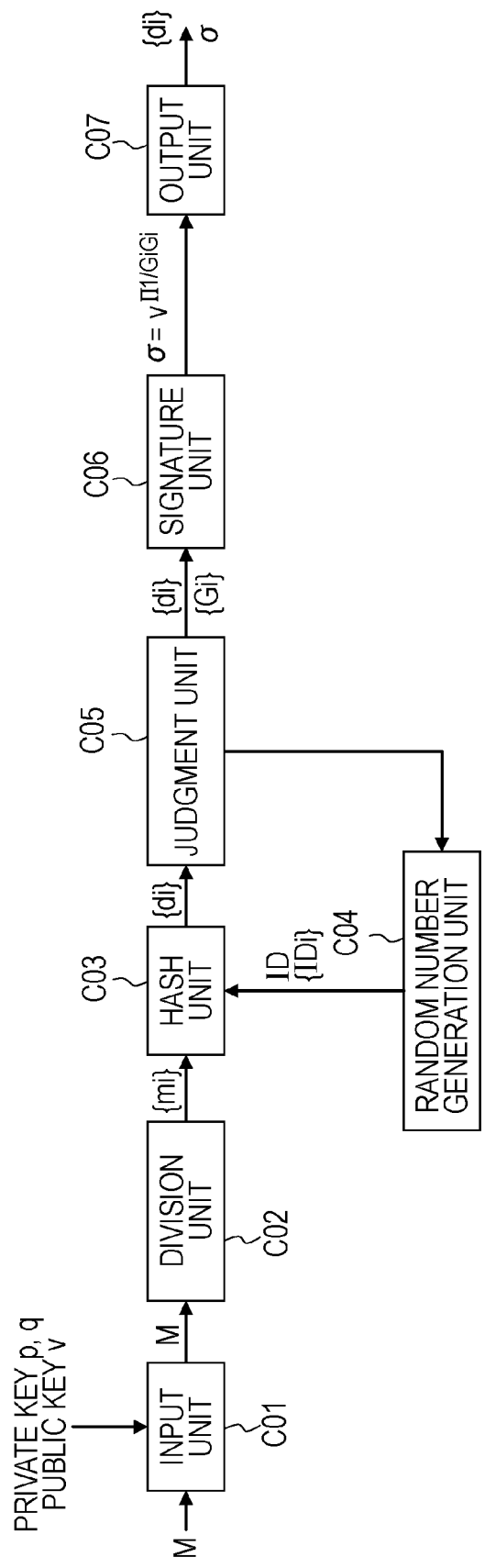
FIG. 3 is a functional block diagram of an electronic document management apparatus (digital signature apparatus) for a signature processing.

Next, a functional configuration of the electronic document management apparatus 101 for the signer according to an embodiment will be described. FIG. 3 is a block diagram showing a functional configuration of the electronic document management apparatus according to an embodiment of this invention. In FIG. 3, the electronic document management apparatus 101 includes an input unit C01 provided with a reception function or mechanism, a division unit C02, a hash unit C03, a random number generation unit C04, a judgment unit C05, a signature unit C06, and an output unit C07 provided with sending unit. These respective units may commonly or exclusively use the memory functioning as the storage unit provided in the computer as the occasion demands.

These respective functions C01 to C07 may realize the function as the program related to the relevant function stored in the storage area is executed by the CPU. Also, output data from the respective functions C01 to C07 are held in the storage area structured by the memory or the like. Also, in the functional configuration at the connection destination indicated by the arrow in FIG. 3, the output data from the function at the connection origin is read from the storage area, and the program related to the relevant function is executed by the CPU.

First, the input unit C01 receives the input electronic document M. The division unit C02 divides the electronic document M into a plurality of partial documents $\{mi\}$. Next, for each of the divided partial documents, the hash unit C03 receives a random number ID common to all the partial documents and random numbers IDi unique to the partial documents from the random number generation unit C04 and calculates a value $Gi=ID\|IDi\|GN(di)$ with respect to $di=ID\|IDi\|mi$. The judgment unit C05 judges whether or not Gi is a prime number. When Gi is not a prime number, the random number generation unit C04 returns to the random numbers IDi unique to the partial documents.

Here, a symbol $x\|y$ denotes concatenation of data x and data y. Also, if the random numbers IDi unique to the partial documents are not in the ascending order or the descending order with respect to the order of the partial documents, the random number generation unit C04 returns to the random numbers IDi unique to the partial documents. Then, the signature unit C06 uses a private key SK to calculate a signature for all the partial documents as follows $\sigma=V^{\Pi 1/GiGi}$.

The output unit C07 outputs the document $D=\{di\}$ and the signature $\sigma$.

It should be noted that at the time of generating the private key, first, two prime numbers p and q having an identical bit length are generated as private keys. Next, a composite number $N=p\times q$ is generated. Finally, an integer v equal to or larger than 1 and smaller than N is generated as a public key.

Herein, the electronic document M is a collective term of documents dealt with on the computer and is electronic data created by using a document creating application or the like. Herein, a digital signature is signature information assigned to the electronic document for certifying the authenticity of the electronic document. That is, similar to a physical signature such as a seal, the digital signature is used for testifying the right creator of the electronic document and the authenticity of the relevant electronic document, that is, for testifying that alternation is not performed. Also, by utilizing a principle of a public key encryption or the like, an arbitrary user may verify the authenticity of the digital signature.

The respective components making up the electronic document M have various states identified by the signature $\sigma$ and the state of the partial document. To be specific, the respective components have one of the state in which the sanitization is allowed and also the deletion is allowed (SADA), the state in which the sanitization is prohibited and also the deletion is allowed (SPDA), the state in which the sanitization is prohibited and also the deletion is prohibited (SPDP), the state in which the sanitization is allowed and also the deletion is prohibited (SADP), the state in which the document is sanitized and also the deletion is prohibited (SDP), the state in which the document is sanitized and also the deletion is allowed(SDA), and the state in which the partial document is deleted (D).

For example, in a case where a certain component has the state in which the sanitization is allowed and also the deletion is allowed(SADA), the reviser may arbitrarily sanitize up or delete this component. Herein, the sanitization puts the document, for example, in a state in which the document may not be recognized by the viewer by applying a sanitization processing or the like. The deletion puts the document in a state in which the existence of the document may not be grasped by the viewer.

In a stage when the processing is performed by the electronic document management apparatus 101, all the components are in the state in which the sanitization is allowed and also the deletion is allowed(SADA). It should be noted that the electronic document M may be created by the electronic document management apparatus 101 and also created by another computer apparatus. In a case where the electronic document M is created by the other computer apparatus, the input unit C01 obtains the electronic document M from the other computer apparatus via the network 110 such as the internet.

[The Electronic Document Management Apparatus 102 for the Reviser]

Figure 4:
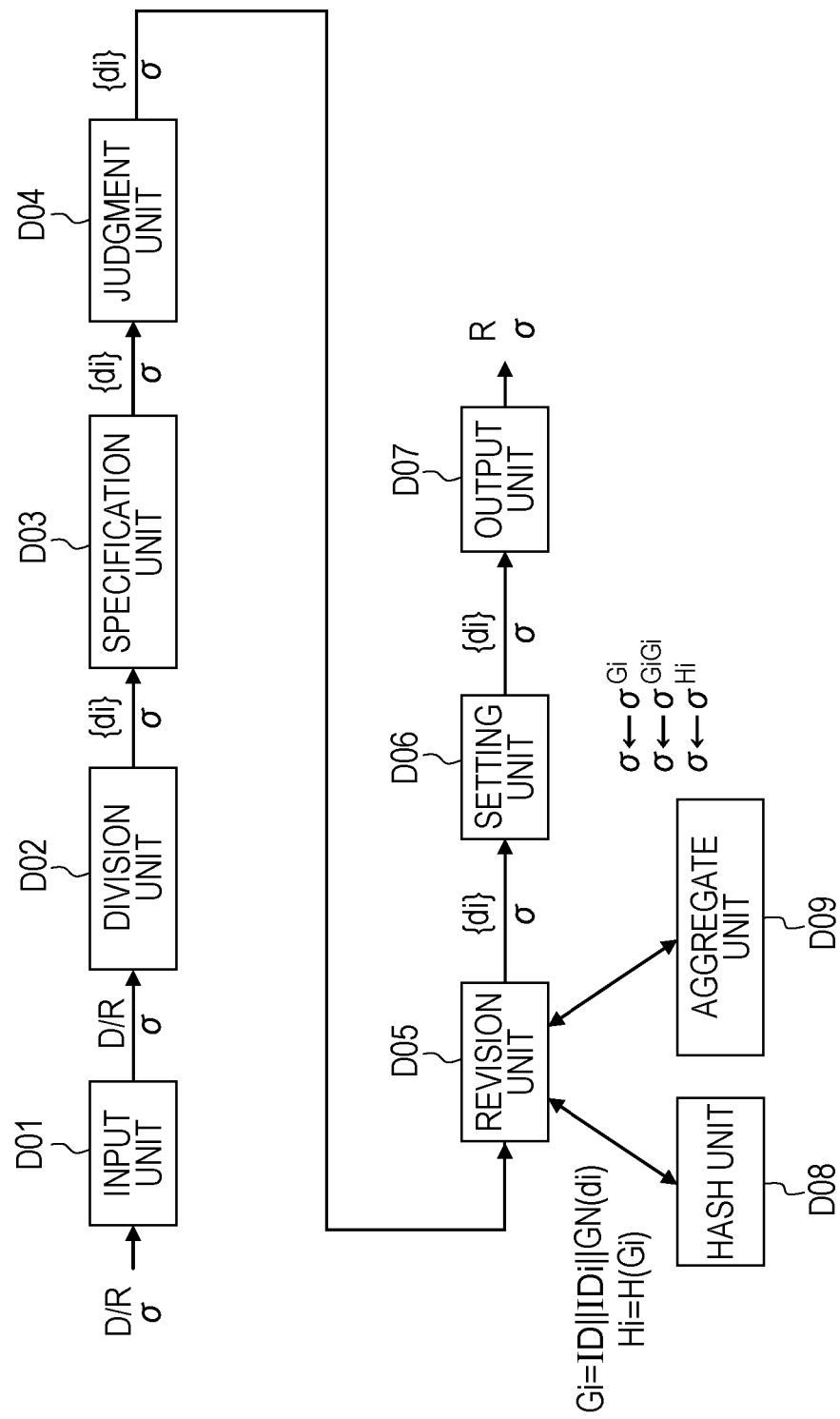
FIG. 4 is a functional block diagram of an electronic document management apparatus (digital signature apparatus) for a revision processing.

Next, a functional configuration of the electronic document management apparatus 102 for the reviser according to an embodiment will be described. FIG. 4 is a block diagram showing a functional configuration of the electronic document management apparatus 102. In FIG. 4, the electronic document management apparatus 102 includes an input unit D01 making up a reception function or mechanism, a division unit D02, a specification unit D03, a judgment unit D04, a revision unit D05, a setting unit D06, an output unit D07 making up a sending function or mechanism, a hash unit D08, and an aggregate unit D09.

As to these respective functions D01 to D09, while the program related to the relevant function stored in the storage area is executed by the CPU, the relevant function may be realized. Also, the output data from the respective functions D01 to D07 is held in the storage area. Also, in a functional configuration at the connection destination indicated by the arrow in FIG. 4, the output data from the function at the connection origin is read from the storage area, and the program related to the relevant function is executed by the CPU.

First, the input unit D01 receives the electronic document D subjected to the signature processing by the electronic document management apparatus 101 and the signature σ. The division unit D02 divides the document into a plurality of partial documents {di}.

The specification unit D03 accepts a specification of a component which becomes a sanitization prohibit target in the partial document di which is obtained by the input unit D01 and divided by the division unit D02. To be specific, for example, as the input apparatus 220 such as the key board 221 or the mouse 222 shown in FIG. 2 is operated by the reviser, a specification on a component which is a sanitization prohibit target is accepted.

The judgment unit D04 judges whether the state indicates that the partial document may be sanitized or the sanitization is prohibited, or the deletion is allowed or prohibited from the state of the partial document specified as the sanitization prohibit target by the specification unit D03. In order to perform this judgment, information indicating any state may be additionally prepared, and also the judgment may be performed on the basis of the signature verification function of the partial document.

In a case where the sanitization is allowed by the judgment unit D04, the revision unit D05 calculates the value Gi=ID∥IDi∥GN(di) by using the hash unit D08 with respect to the partial document which is the sanitization prohibit target. Then, the revision unit D05 aggregates the signature σ input to the input unit D01 by using the aggregate unit D09 ($\sigma \leftarrow \sigma^{Gi}$).

As a result of the revision by the revision unit D05, the setting unit D06 changes the state of the partial document which is the sanitization prohibit target from the state in which the sanitization is allowed to the state in which the sanitization is prohibited. That is, in a case where the signature σ is revised with the information on the partial document which is the sanitization prohibit target in the state in which the sanitization is allowed and also the deletion is allowed (SADA), the setting unit D06 sets the relevant partial document in the state in which the sanitization is prohibited and also the deletion is allowed (SPDA). As a result, the component which is the sanitization prohibit target and is in the state in which the sanitization is allowed and also the deletion is allowed (SADA) is in the state in which the sanitization is prohibited and also the deletion is allowed (SPDA) where the deletion may be performed but the sanitization may not be performed. Also, in a case where the signature σ is revised with the information on the partial document which is the sanitization prohibit target in the state in which the sanitization is allowed and also the deletion is prohibited (SADP), the setting unit D06 sets the relevant partial document in the state in which sanitization is prohibited and also the deletion is prohibited (SPDP). As a result, the component which is specified as the sanitization prohibit target in the state in which the sanitization is allowed and also the deletion is prohibited (SADP) is put in the state in which the sanitization is prohibited and also the deletion is prohibited (SPDP).

Also, the specification unit D03 may accept a specification of the partial document which is the sanitization target among the partial documents di. In a case where it is judged by the judgment unit D04 that the sanitization is allowed, the revision unit D05 calculates the value Gi=ID∥IDi∥GN with respect to the partial document which is the sanitization target by using the hash unit D08 to replace the partial document di by the value Gi. As a result, the partial document specified as the sanitization target in the state in which the sanitization is allowed is put into the state in which the partial document is sanitized.

The specification unit D03 may accept a specification of the partial document which is the deletion prohibit target among the partial documents di. In a case where it is judged by the judgment unit D04 that the partial document is in the state in which the deletion is allowed, the revision unit D05 calculates the hash value Hi=H(Gi)=H(ID∥IDi∥GN(di)) with respect to the partial document which is the deletion prohibit target by using the hash unit D08 twice. Then, the revision unit D05 aggregates the signature σ input to the input unit D01 by using the aggregate unit D09 ($\sigma \leftarrow \sigma^{Hi}$). As a result, the partial document specified as the deletion prohibit target in the state in which the deletion is allowed is put in the deletion prohibit state in which the deletion is not allowed.

In a case where it is judged by the judgment unit D04 that the partial document is in the state in which the deletion is allowed and also the sanitization is allowed (SADA), the revision unit D05 calculates the value Gi=ID∥IDi∥GN(di) with respect to the deletion target partial document by using the hash unit D08. Then, the revision unit D05 aggregates the signature σ input to the input unit D01 with the hash value thereof twice by using the aggregate unit D09 ($\sigma \leftarrow \sigma^{GiGi}$).

Also, in a case where it is judged by the judgment unit D04 that the partial document is in the state in which the deletion is allowed and also the sanitization is prohibited (SPDA), the revision unit D05 calculates the value Gi=ID∥IDi∥GN(di) with respect to the deletion target partial document by using the hash unit D08. Then, the revision unit D05 aggregates the signature σ input to the input unit D01 with the hash value by using the aggregate unit D09 ($\theta \leftarrow \sigma^{Gi}$).

Also, in a case where it is judged by the judgment unit D04 that the partial document is in the state in which the deletion is allowed and also the partial document is sanitized (SDA), the deletion target partial document has the value Gi=∥ID∥IDi∥GN(di). At this time, the revision unit D05 aggregates the signature σ input to the input unit D01 with the hash value twice by using the aggregate unit D09 ($\sigma \leftarrow \sigma^{GiGi}$).

Also, as a result of the deletion by the revision unit D05, the setting unit D06 changes the state of the deletion target partial document from the state in which the deletion is allowed to the state in which the partial document is deleted. Also, the setting unit D06 deletes the partial document di itself. As a result, the partial document specified as the deletion target in state in which the deletion is allowed is put in the state in which the partial document is deleted (D) from the electronic document M.

It should be noted that the specification of the above-mentioned partial document which is the sanitization prohibit target and the specification of the partial documents of the deletion prohibit target and the deletion target may be performed by the mutually different electronic document management apparatuses 102. That is, in one of the electronic document management apparatuses 102, the partial document in the state in which the sanitization is allowed and also the deletion is allowed (SADA) is set as the sanitization prohibit target, and in the other electronic document management apparatus 102, the partial document set in the state in which the deletion is allowed may be set as the deletion prohibit target or the deletion target.

The output unit D07 outputs the electronic document M (the revised document R which will be described) and the signature σ revised or set by the setting unit D06. An output format by the output unit D07 may be any one of a print output in an external computer apparatus (for example, the electronic document management apparatus 102, 103), a print output in the printer 233, and a data output (save) to the memory.

Also, the input unit D01 obtains the revised document R created by already revising the revision target partial document. To be specific, the input unit D01 obtains the revised document R in which the states of the components are set by the setting unit D06. The revised document R is electronic data obtained by revising the component making up the electronic document M. For example, regarding the revised document R, the state of the component specified as the sanitization prohibit target is set from the state in which the sanitization is allowed and also the deletion is allowed (SADA) to the state in which the sanitization is prohibited and also the deletion is allowed (SPDA).

In a case where the disclosure request of the revised document R is issued from the verifier to the reviser, the revised document R is sent (output) from the electronic document management apparatus 102 for the reviser to the electronic document management apparatus 103 for the verifier. Then, an input unit E01 of the electronic document management apparatus 103 for the verifier obtains the revised document R sent from the electronic document management apparatus 102 for the reviser.

[The Electronic Document Management Apparatus 103 for the Verifier]

Figure 5:
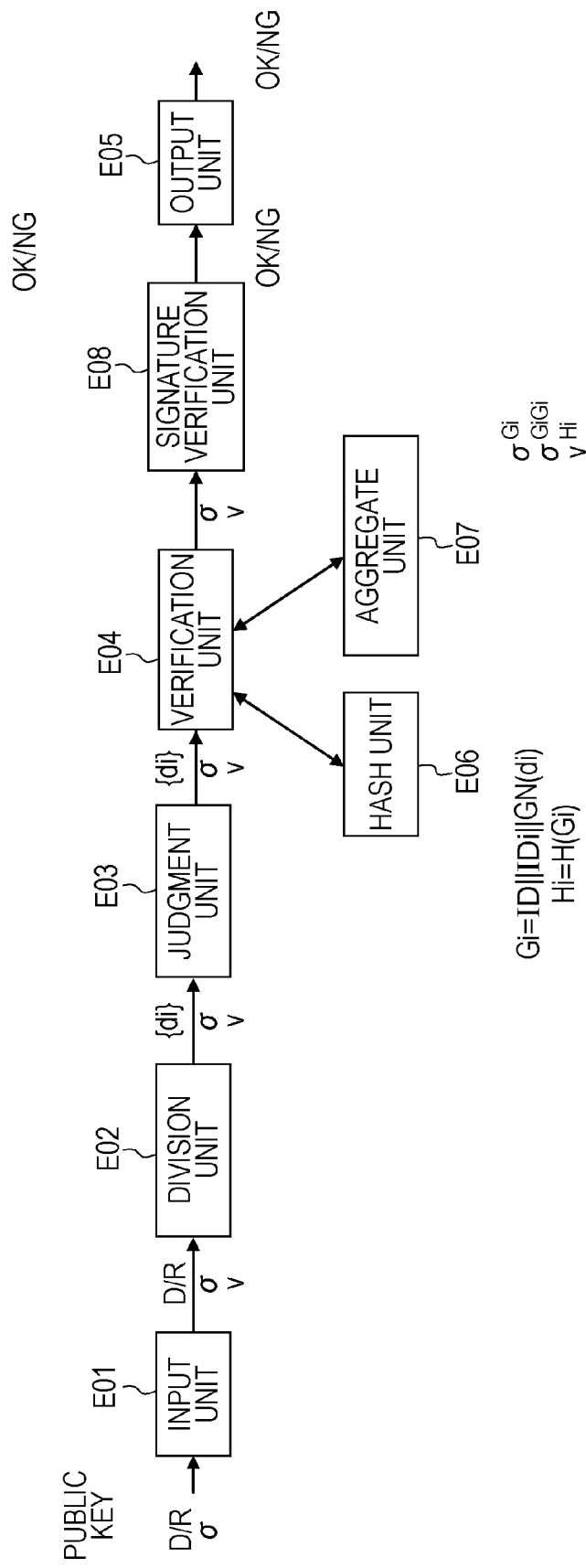
FIG. 5 is a functional block diagram of an electronic document management apparatus (digital signature apparatus) for a verification processing.

Next, a functional configuration of the electronic document management apparatus 103 for the verifier according to an embodiment will be described. FIG. 5 is a block diagram showing a functional configuration of the electronic document management apparatus 103. In FIG. 5, the electronic document management apparatus 103 includes the input unit E01 making up a reception function or mechanism, a division unit E02, a judgment unit E03, a verification unit E04, an output unit E05 making up a sending function or mechanism, a hash unit E06, an aggregate unit E07, and a signature verification unit E08.

As to these respective functions E01 to E08, while the program related to the relevant function stored in the storage area is executed by the CPU, the relevant function may be realized. Also, the output data from the respective functions E01 to E08 is held in the storage area. Also, in a functional configuration at the connection destination indicated by the arrow in FIG. 5, the output data from the function at the connection origin is read from the storage area, the program related to the relevant function is executed by the CPU.

The input unit E01 receives the electronic document M or the revised document R subjected to the signature processing by the electronic document management apparatus 101 or 102 and the signature σ. The division unit E02 divides the document into a plurality of partial documents {di}. At this time, in a case where a value not equal to the random number ID common to all the partial documents is included or a case where the random numbers IDi unique to the respective partial documents are not in ascending order or descending order, it is judged that the signature is not valid (NG). In this case, the output unit E05 outputs sends a result of the signature verification that the signature is not valid (NG).

The judgment unit E03 judges whether the state indicates that the partial document may be sanitized or the sanitization is prohibited, or the deletion is allowed or prohibited from the respective states of the partial documents. In order to perform this judgment, information indicating any state may be additionally prepared, and also the judgment may be performed on the basis of the signature verification function of the partial document.

In a case where it is judged by the judgment unit E03 that the certain document is in the state in which the sanitization is allowed and also the deletion is allowed (SADA), the verification unit E04 calculates the value Gi=ID∥IDi∥GN(di) with respect to the target partial document by using the hash unit E06. Then, the verification unit E04 aggregates the signature σ input to the input unit E01 (or revised by the verification unit E04) twice with the hash value by using the aggregate unit E07 ($\sigma \leftarrow \sigma^{GiGi}$).

Also, in a case where it is judged by the judgment unit E03 that the certain document is in the state in which the sanitization is prohibited and also the deletion is allowed (SPDA), the verification unit E04 calculates the value Gi=ID∥IDi∥GN (di) with respect to the target partial document by using the hash unit E06. Then, the verification unit E04 aggregates the hash value with the signature σ input to the input unit E01 (or revised by the verification unit E04) by using the aggregate unit E07 ($\sigma \leftarrow \sigma^{Gi}$).

Also, in a case where it is judged by the judgment unit E03 that the certain document is in the state in which the document is sanitized up and also the deletion is allowed (SDA), the target partial document is replaced by the value Gi=ID∥IDi∥GN(di). At this time, the verification unit E04 uses the hash value as it is and aggregates the signature σ input to the input unit E01 (or revised by the verification unit E04) with the hash value twice by using the aggregate unit E07 ($\sigma \leftarrow \sigma^{GiGi}$).

Also, in a case where it is judged by the judgment unit E03 that the certain document is in the state in which the deletion is prohibited and also the sanitization is allowed (SADP), the verification unit E04 calculates the value Gi=ID∥IDi∥GN(di) and the hash value Hi=H(Gi) with respect to the target partial document by using the hash unit E06. Then, the verification unit E04 aggregates the signature σ input to the input unit E01 (or revised by the verification unit E04) with the value Gi twice by using the aggregate unit E07 ($\sigma \leftarrow \sigma^{GiGi}$). Also, the verification unit E04 aggregates a value v included in a public key PK (or revised by the verification unit E04) with the hash value Hi by using the aggregate unit E07 ($v \leftarrow v^{Hi}$).

Also, in a case where it is judged by the judgment unit E03 that the certain document is in the state in which the deletion is prohibited and also the sanitization is prohibited (SPDP), the verification unit E04 calculates the value Gi=ID||IDi||GN (di) and the hash value Hi=H(Gi) with respect to the target partial document by using the hash unit E06. Then, the verification unit E04 aggregates the signature σ input to the input unit E01 (or revised by the verification unit E04) with the value Gi by using the aggregate unit E07 (σ←σ$^{Gi}$). Also, the verification unit E04 aggregates the hash value Hi with the value v included in the public key PK (or revised by the verification unit E04) by using the aggregate unit E07 (v←v$^{Hi}$).

Also, in a case where it is judged by the judgment unit E03 that the certain document is in the state in which the deletion is prohibited and also the document is sanitized (SDP), as the target partial document is replaced by the value Gi=ID||IDi||GN(di), the verification unit E04 further calculates the hash value Hi=H(Gi) by using the hash unit E06. Then, the verification unit E04 aggregates the signature σ input to the input unit E01 (or revised by the verification unit E04) with the value Gi twice by using the aggregate unit E07 (σ←σ$^{GiGi}$). Also, the verification unit E04 aggregates the value v included in the public key PK (or revised by the verification unit E04) with the hash value Hi by using the aggregate unit E07 (v←v$^{Hi}$).

The signature verification unit E08 compares the signature σ revised by the verification unit E04 with the value v. In the case of the same value, the signature verification unit E08 judges that the signature is valid (OK). In the case of different values, the signature verification unit E08 judges that the signature is not valid (NG).

The output unit E05 outputs a judgment result of the signature verification unit E08. An output format by the output unit E05 may be any one of a print output in an external computer apparatus (for example, the electronic document management apparatus 102, 103), a print output in the printer 233, and a data output (save) to the memory (for example.

[Procedure for a Signature Processing]

Figure 6:
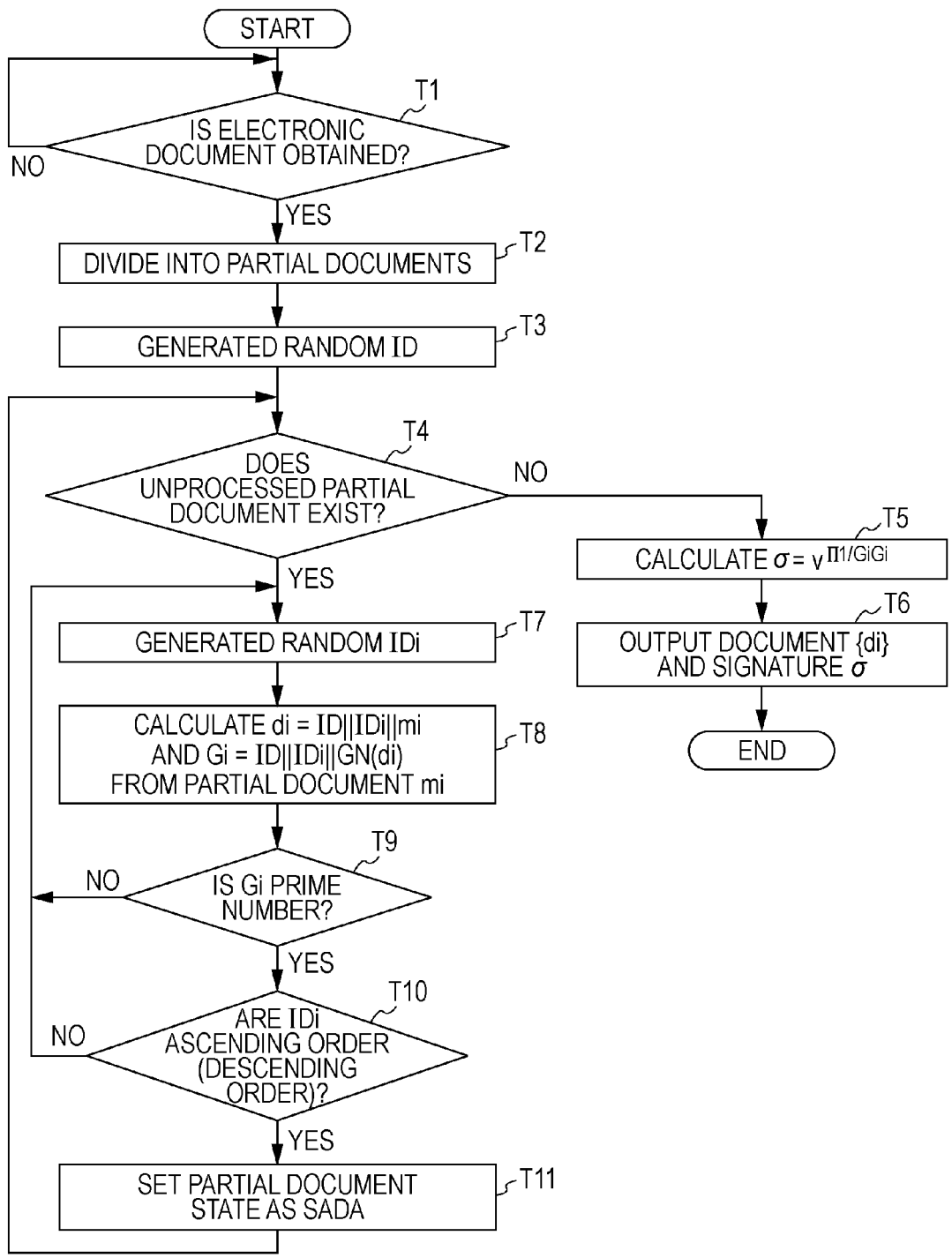
FIG. 6 is a flow chart showing a procedure of the signature processing.

Next, a procedure for an electronic document signature processing executed by the document management apparatus 101 will be described. FIG. 6 is a flow chart showing a procedure of an electronic document signature processing executed by the document management apparatus according to this invention.

In FIG. 6, first, the input unit C01 functioning as the document management apparatus judges whether or not an input of a document is accepted (T1). At this time, in a case where the document M is input, the division unit C02 performs the division into the respective partial documents making up the document {mi} (T2). At the same time, the random number generation unit C04 generates a random number ID (T3).

Next, the document management apparatus 101 repeatedly performs the following processing with respect to all the respective partial documents (T4). If an unprocessed partial document does not exist, the signature unit C06 calculates the digital signature σ=v$^{Π1/GiGi}$ (T5).) Then, the output unit C07 outputs (sends) the document M and the signature σ (T6). As a result, the signature processing is ended.

In a case where an unprocessed partial document exists, with respect to the selected partial document mi, the random number generation unit C04 generates the random numbers IDi unique to the partial documents. Then, the hash unit C03 calculates the value Gi=ID||IDi||GN(di) with respect to di=||ID||IDi||mi (T8).

Next, the judgment unit C05 judges whether or not Gi is a prime number. In a case where Gi is not a prime number, the judgment unit C05 returns to the generation of the random numbers IDi unique to the partial documents (T9). Also, the judgment unit C05 judges whether or not IDi are in the ascending order or the descending order. In a case where IDi are not in the ascending order or the descending order, the judgment unit C05 returns to the generation of the random numbers IDi unique to the partial documents (T10).

Finally, the judgment unit C05 sets the state of the relevant partial document di in the state in which the sanitization is allowed and also the deletion is allowed (SADA) (T11). The above-mentioned processing is repeatedly performed for all the partial documents.

[Procedure for a Revision Processing]

Next, a procedure for an electronic document signature processing executed by the document management apparatus 102 will be described. FIGS. 7A to 7H are flow charts showing a procedure for an electronic document revision processing.

In FIG. 7A, first, the input unit D01 functioning as the document management apparatus judges whether or not the signed document and an input of the signature are accepted (U1). At this time, in a case where the document M and the signature σ are input, the division unit D02 performs the division into the respective partial documents making up the document {di} (U2).

At this time, the input unit D01 accepts not only the signed document M but also the revised document R. In the case of the signed document M, the states of the respective partial documents are all the state in which the sanitization is allowed and also the deletion is allowed (SADA). In the case of the revised document R, the partial documents may hold the following six states including the state in which the sanitization is prohibited and also the deletion is prohibited (SPDP), the state in which the sanitization is allowed and also the deletion is prohibited (SADP), the state in which the partial document is sanitized and also the deletion is prohibited (SDP), the state in which the sanitization is allowed and also the deletion is allowed (SPDA), the state in which the sanitization is allowed and also the deletion is allowed (SADA), and the state in which the partial document is sanitized and also the deletion is allowed (SDA). It should be noted that in the case of the state in which the partial document is deleted (D), the partial document is deleted, and as the state of the partial document of the revised document R, the state in which the partial document is deleted (D) may not be adopted.

Next, the document management apparatus 102 repeatedly performs the following processing with respect to all the respective partial documents (U3). If an unprocessed partial document does not exist, the output unit D07 outputs the revised document R and the revision signature σ (U4) to end the signature processing.

In the repetition processing for the respective partial documents, first, the specification unit D03 accepts an input of specifying the state revision for the respective partial documents. Then, depending on the specified state, the specification unit D03 branches to one of the following processings [A] to [G] (U5). In a case where a shift is specified to the state in which the sanitization is prohibited and also the deletion is prohibited (SPDP), the processing [A] is performed. In a case where a shift is specified to the state in which the sanitization is allowed and also the deletion is prohibited (SADP), the processing [B] is performed. In a case where a shift is specified to the state in which the partial document is sanitized and also the deletion is prohibited (SDP), the processing [C] is performed. In a case where a shift is specified to the state in which the sanitization is prohibited and also the deletion is allowed (SPDA), the processing [D] is performed. In a case where a shift is specified to the state in which the sanitization is allowed and also the deletion is allowed (SADA), the processing [E] is performed. In a case where a shift is specified to the state in which the partial document is sanitized and also the deletion is allowed (SDA), the processing [F] is performed. In a case where a shift is specified to the state of the deletion (D), the processing [G] is performed.

After these branch processings (F001), if an error is detected, the output unit D07 outputs an error (U6, U7), and the processing is substantially stopped. The above-mentioned processing is carried out for all the partial documents. Hereinafter, the processings in step U5 will be described.

Processing [A]:

The processing A is illustrated in FIG. 7B. First, the judgment unit D04 judges a current state of the partial document. Then, the judgment unit D04 branches the processing depending on the six states including the state in which the sanitization is prohibited and also the deletion is prohibited (SPDP), the state in which the sanitization is allowed and also the deletion is prohibited (SADP), the state in which the partial document is sanitized and also the deletion is prohibited (SDP), the state in which the sanitization is prohibited and also the deletion is allowed (SPDA), the state in which the sanitization is allowed and also the deletion is allowed (SADA), the state in which the partial document is sanitized and also the deletion is allowed (SDA).

When the state of the partial document di is the state in which the sanitization is prohibited and also the deletion is prohibited (SPDP), no change occurs. For that reason, the judgment unit D04 returns to the original processing as it is (F001).

When the state of the partial document di is the state in which the sanitization is allowed and also the deletion is prohibited (SADP), from the partial document di, the hash unit D08 calculates the value Gi=ID||IDi||GN(di) (U11). Then, the aggregate unit D09 aggregates the signature σ and the value Gi. The revision unit D05 revises σ←$σ^{Gi}$ (U12). Finally, the setting unit D06 sets the state of the partial document after the revision as the state in which the sanitization is prohibited and also the deletion is prohibited (SPDP) (U13) and returns to the original processing (F001).

When the state of the partial document di is the state in which the partial document is sanitized and also the deletion is prohibited (SDP), the change to the state in which the sanitization is prohibited and also the deletion is prohibited (SPDP) may not be performed. For that reason, the judgment unit D04 judges this situation as an error and returns to the processing (F001).

When the state of the partial document di is the state in which the sanitization is prohibited and also the deletion is allowed (SPDA), from the partial document di, the hash unit D08 calculates the hash value Hi=H(ID||IDi||GN(di)) (U14). Then, the aggregate unit D09 aggregates the signature σ and the hash value Hi. The revision unit D05 revises σ←$σ^{Hi}$ (U15). Finally, the setting unit D06 sets the state of the partial document after the revision as the state in which the sanitization is prohibited and also the deletion is prohibited (SPDP) (U16) and returns to the original processing (F001).

When the state of the partial document di is the state in which the sanitization is allowed and also the deletion is allowed (SADA), from the partial document di, the hash unit D08 calculates the value Gi=ID||IDi||GN(di) and the hash value Hi=H(ID||IDi||GN(di)) (U17). Then, the aggregate unit D09 aggregates the signature σ and the value Gi, the hash value Hi. The revision unit D05 revises σ←$σ^{GiHi}$ (U18). Finally, the setting unit D06 sets the state of the partial document after the revision as the state in which the sanitization is prohibited and also the deletion is prohibited (SPDP) (U19) and returns to the original processing (F001).

When the state of the partial document di is the state in which the partial document is sanitized and also the deletion is allowed (SDA), the change to the state in which the sanitization is prohibited and also the deletion is prohibited (SPDP) may not be performed. For that reason, the judgment unit D04 judges this situation as an error and returns to the processing (F001).

Processing [B]

Figure 7C:
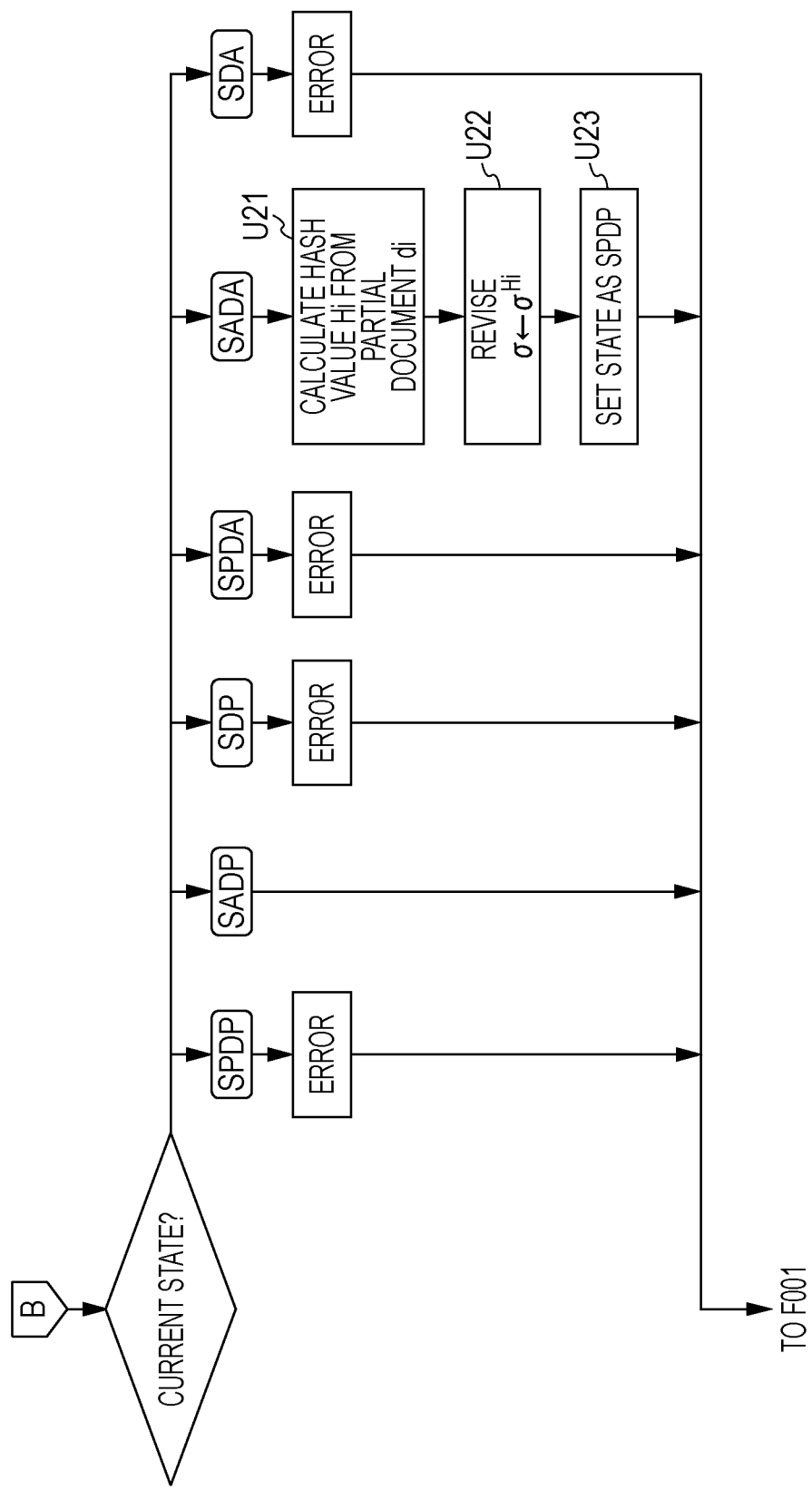
FIG. 7C is a third flow chart showing the procedure of the revision processing.

The processing B is illustrated in FIG. 7C. When the state of the partial document di is the state in which the sanitization is prohibited and also the deletion is prohibited (SPDP), the change to the state in which the sanitization is allowed and also the deletion is prohibited (SADP) may not be performed. For that reason, the judgment unit D04 judges this situation as an error and returns to the processing (F001).

When the state of the partial document di is the state in which the sanitization is allowed and also the deletion is prohibited (SADP), no change occurs. For that reason, the judgment unit D04 returns to the original processing as it is (F001).

When the state of the partial document di is the state in which the partial document is sanitized and also the deletion is prohibited (SDP), the change to the state in which the sanitization is allowed and also the deletion is prohibited (SADP) may not be performed. For that reason, the judgment unit D04 judges this situation as an error and returns to the processing (F001).

When the state of the partial document di is the state in which the sanitization is prohibited and also the deletion is allowed (SPDA), the change to the state in which the sanitization is allowed and also the deletion is prohibited (SADP) may not be performed. For that reason, the judgment unit D04 judges this situation as an error and returns to the processing (F001).

When the state of the partial document di is the state in which the sanitization is allowed and also the deletion is allowed (SADA), from the partial document di, the hash unit D08 calculates the hash value Hi=H(ID||IDi||GN(di)) (U21). Then, the aggregate unit D09 aggregates the signature σ and the hash value Hi. The revision unit D05 revises σ←$σ^{Hi}$ (U22). Finally, the setting unit D06 sets the state of the partial document after the revision as the state in which the sanitization is allowed and also the deletion is prohibited (SADP) (U23) and returns to the original processing (F001).

When the state of the partial document di is the state in which the partial document is sanitized and also the deletion is allowed (SDA), the change to the state in which the sanitization is allowed and also the deletion is prohibited (SADP) may not be performed. For that reason, the judgment unit D04 judges this situation as an error and returns to the processing (F001).

Processing [C]

Figure 7D:
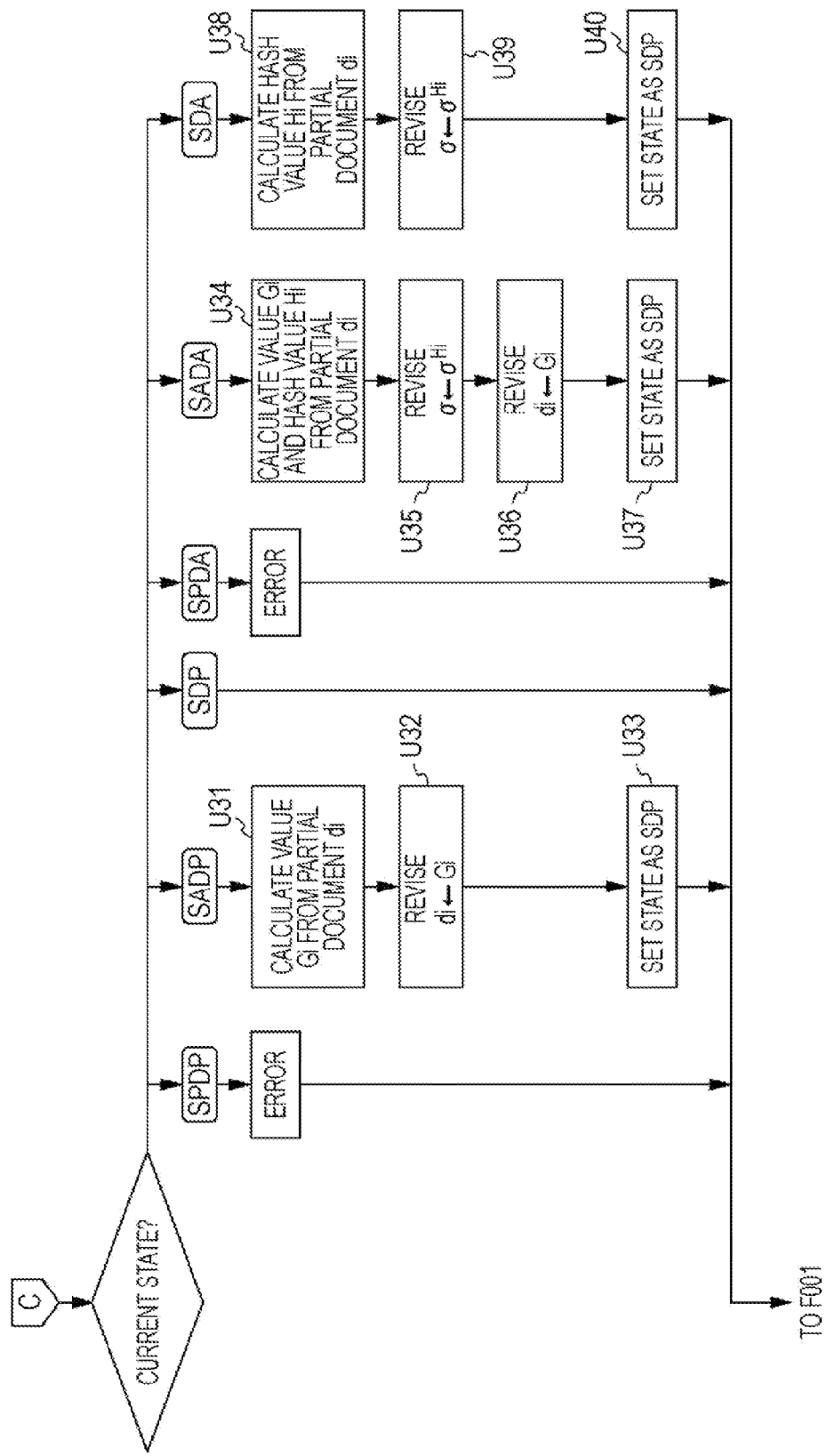
FIG. 7D is a fourth flow chart showing the procedure of the revision processing.

The processing C is illustrated in FIG. 7D. When the state of the partial document di is the state in which the c sanitization is prohibited and also the deletion is prohibited (SPDP), the change to the state in which the partial document is sanitized and also the deletion is prohibited (SDP) may not be performed. For that reason, the judgment unit D04 judges this situation as an error and returns to the processing (F001).

When the state of the partial document di is the state in which the sanitization is allowed and also the deletion is prohibited (SADP), from the partial document di, the hash unit D08 calculates the value Gi=ID||IDi||GN(di) (U31). The revision unit D05 revises the partial document di←Gi (U32). Finally, the setting unit D06 sets the state of the partial document after the revision as the state in which the partial document is sanitized and also the deletion is prohibited (SDP) (U32) and returns to the original processing (F001).

When the state of the partial document di is the state in which the partial document is sanitized and also the deletion is prohibited (SDP), no change occurs. For that reason, the judgment unit D04 returns to the original processing as it is (F001).

When the state of the partial document di is the state in which the sanitization is prohibited and also the deletion is allowed (SPDA), the change to the state in which the partial document is sanitized and also the deletion is prohibited (SDP) may not be performed. For that reason, the judgment unit D04 judges this situation as an error and returns to the processing (F001).

When the state of the partial document di is the state in which the sanitization is allowed and the deletion is allowed (SADA), from the partial document di, the hash unit D08 calculates the value Gi=ID∥IDi∥GN(di) and the hash value Hi=H(Gi) (U34). Then, the aggregate unit D09 aggregates the signature σ and the hash value Hi. The revision unit D05 revises σ←$σ^{Hi}$ (U35). Also, the partial document di←Gi (U36). Finally, the setting unit D06 sets the state of the partial document after the revision as the state in which the partial document is sanitized and also the deletion is prohibited (SDP) (U37) and returns to the original processing (F001).

When the state of the partial document di is the state in which the partial document is sanitized and also the deletion is allowed (SDA), the partial document di is already revised into Gi=ID∥IDi∥GN(di). For this reason, the hash unit D08 calculates the hash value Hi=H(di) of the partial document di (U38). Then, the aggregate unit D09 aggregates the signature σ and the hash value Hi. The revision unit D05 revises σ←$σ^{Hi}$ (U39). Finally, the setting unit D06 sets the state of the partial document after the revision as the state in which the partial document is sanitized and the deletion is prohibited (SDP) (U40) and returns to the original processing (F001).

Processing [D]

The processing D is illustrated in FIG. 7E. When the state of the partial document di is the state in which the sanitization is prohibited and also the deletion is prohibited (SPDP), the change to the state in which the sanitization is prohibited and also the deletion is allowed (SPDA) may not be performed. For that reason, the judgment unit D04 judges this situation as an error and returns to the processing (F001).

When the state of the partial document di is the state in which the sanitization is allowed and also the deletion is prohibited (SADP), the change to the state in which the sanitization is prohibited and also the deletion is allowed (SPDA) may not be performed. For that reason, the judgment unit D04 judges this situation as an error and returns to the processing (F001).

When the state of the partial document di is the state in which the partial document is sanitized and also the deletion is prohibited (SDP), the change to the state in which the sanitization is prohibited and also the deletion is allowed (SPDA) may not be performed. For that reason, the judgment unit D04 judges this situation as an error and returns to the processing (F001).

When the state of the partial document di is the state in which the sanitization is prohibited and also the deletion is allowed (SPDA), no change occurs. For that reason, the judgment unit D04 returns to the original processing as it is (F001).

When the state of the partial document di is the state in which the sanitization is allowed and also the deletion is allowed (SADA), from the partial document di, the hash unit D08 calculates the value Gi=ID∥IDi∥GN(di) (U41). Then, the aggregate unit D09 aggregates the signature σ and the value Gi. The revision unit D05 revises σ←$σ^{Gi}$ (U42). Finally, the setting unit D06 sets the state of the partial document after the revision as the state in which the sanitization is prohibited and also the deletion is allowed (SPDA) and returns to the original processing (F001).

When the state of the partial document di is the state in which the partial document is sanitized and also the deletion is allowed (SDA), the change to the state in which the sanitization is prohibited and also the deletion is allowed (SPDA) may not be performed. For that reason, the judgment unit D04 judges this situation as an error and returns to the processing (F001).

Processing [E]

The processing E is illustrated in FIG. 7F. When the state of the partial document di is the state in which the sanitization is prohibited and also the deletion is prohibited (SPDP), the change to the state in which the sanitization is allowed and also the deletion is allowed (SADA) may not be performed. For that reason, the judgment unit D04 judges this situation as an error and returns to the processing (F001).

When the state of the partial document di is the state in which the sanitization is allowed and also the deletion is prohibited (SADP), the change to the state in which the sanitization is allowed and also the deletion is allowed (SADA) may not be performed. For that reason, the judgment unit D04 judges this situation as an error and returns to the processing (F001).

When the state of the partial document di is the state in which the partial document is sanitized and also the deletion is prohibited (SDP), the change to the state in which the sanitization is allowed and also the deletion is allowed (SADA) may not be performed. For that reason, the judgment unit D04 judges this situation as an error and returns to the processing (F001).

When the state of the partial document di is the state in which the sanitization is prohibited and also the deletion is allowed (SPDA), the change to the state in which the sanitization is allowed and also the deletion is allowed (SADA) may not be performed. For that reason, the judgment unit D04 judges this situation as an error and returns to the processing (F001).

When the state of the partial document di is the state in which the sanitization is allowed and also the deletion is allowed (SADA), no change occurs. For that reason, the judgment unit D04 returns to the original processing as it is (F001).

When the state of the partial document di is the state in which the partial document is sanitized and also the deletion is allowed (SDA), the change to the state in which the sanitization is allowed and also the deletion is allowed (SADA) may not be performed. For that reason, the judgment unit D04 judges this situation as an error and returns to the processing (F001).

Processing [F]

Figure 7G:
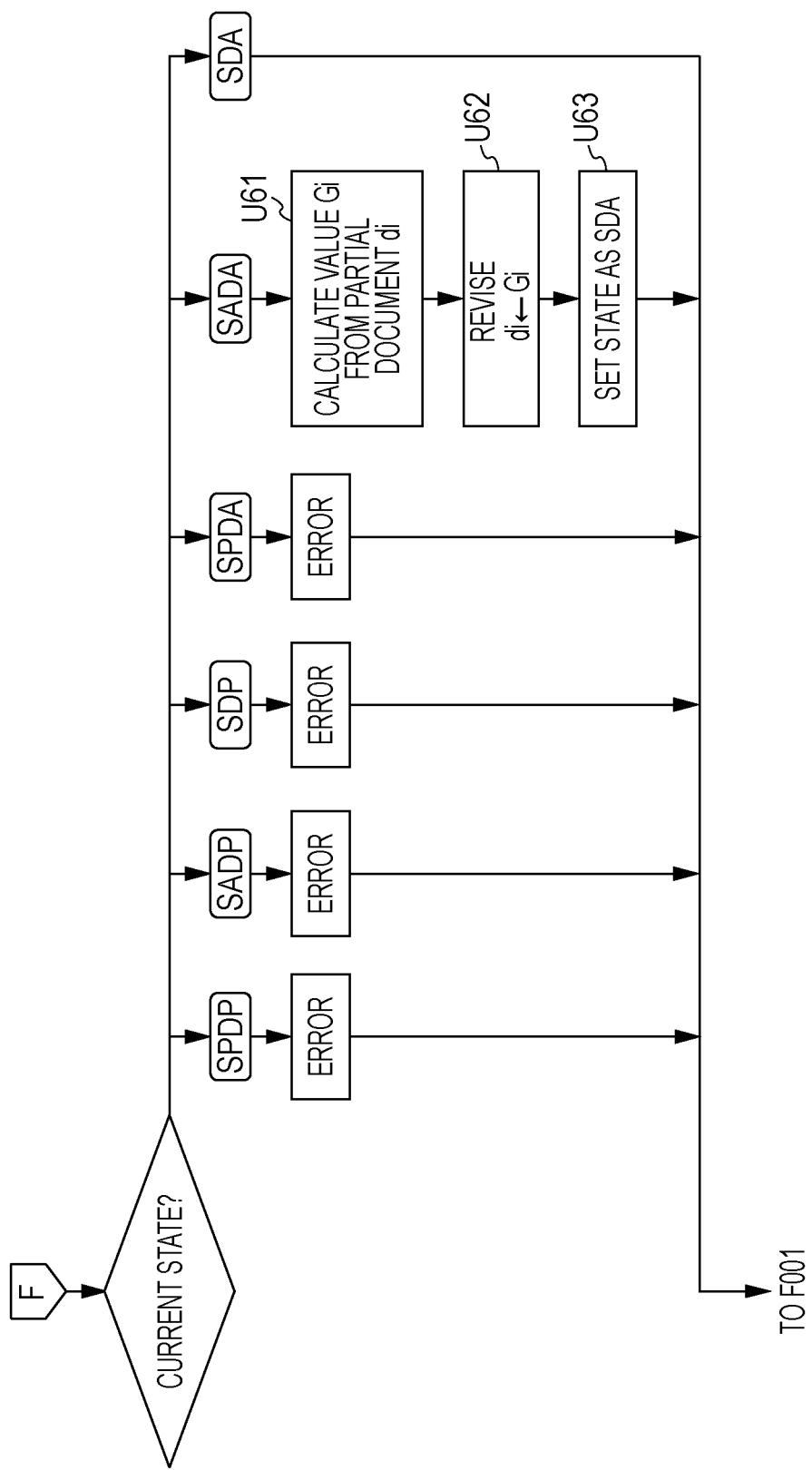
FIG. 7G is a seventh flow chart showing the procedure of the revision processing.

The processing F is illustrated in FIG. 7G. When the state of the partial document di is the state in which the sanitization is prohibited and also the deletion is prohibited (SPDP), the change to the state in which the partial document is sanitized and also the deletion is allowed (SDA) may not be performed. For that reason, the judgment unit D04 judges this situation as an error and returns to the processing (F001).

When the state of the partial document di is the state in which the sanitization is allowed and also the deletion is prohibited (SADP), the change to the state in which the partial document is sanitized and also the deletion is allowed (SDA)

may not be performed. For that reason, the judgment unit D04 judges this situation as an error and returns to the processing (F001).

When the state of the partial document di is the state in which the partial document is sanitized and also the deletion is prohibited (SDP), the change to the state in which the partial document is sanitized and also the deletion is allowed (SDA) may not be performed. For that reason, the judgment unit D04 judges this situation as an error and returns to the processing (F001).

When the state of the partial document di is the state in which the sanitization is prohibited and also the deletion is allowed (SPDA), the change to the state in which the partial document is sanitized and also the deletion is allowed (SDA) may not be performed. For that reason, the judgment unit D04 judges this situation as an error and returns to the processing (F001).

When the state of the partial document di is the state in which the sanitization is allowed and also the deletion is allowed (SADA), from the partial document di, the hash unit D08 calculates the value Gi=ID∥IDi∥GN(di) (U61). The revision unit D05 revises the partial document di←Gi (U62). Finally, the setting unit D06 sets the state of the partial document after the revision as the state in which the sanitization is prohibited and also the deletion is allowed (SDA) (U63) and returns to the original processing (F001).

When the state of the partial document di is the state in which the partial document is sanitized and also the deletion is allowed (SDA), no change occurs. For that reason, the judgment unit D04 returns to the original processing as it is (F001).

Processing [G]

The processing G is illustrated in FIG. 7H. When the state of the partial document di is the state in which the sanitization is prohibited and also the deletion is prohibited (SPDP), the change to the state in which the partial document is deleted (D) may not be performed. For that reason, the judgment unit D04 judges this situation as an error and returns to the processing (F001).

When the state of the partial document di is the state in which the sanitization is allowed and also the deletion is prohibited (SADP), the change to the state in which the partial document is deleted (D) may not be performed. For that reason, the judgment unit D04 judges this situation as an error and returns to the processing (F001).

When the state of the partial document di is the state in which the partial document is sanitized and also the deletion is prohibited (SDP), the change to the state in which the partial document is deleted (D) may not be performed. For that reason, the judgment unit D04 judges this situation as an error and returns to the processing (F001).

When the state of the partial document di is the state in which the sanitization is prohibited and also the deletion is allowed (SPDA), from the partial document di, the hash unit D08 calculates the value Gi=ID∥IDi∥GN(di) (U71). Then, the aggregate unit D09 aggregates the signature σ and the value Gi. The revision unit D05 revises σ←$σ^{Gi}$ (U72). Also, the revision unit D05 deletes the partial document di (U73). Finally, the setting unit D06 deletes the state (U74) and returns to the original processing (F001).

When the state of the partial document di is the state in which the sanitization is allowed and also the deletion is allowed (SADA), from the partial document di, the hash unit D08 calculates the value Gi=ID∥IDi∥GN(di) (U75). Then, the aggregate unit D09 aggregates the signature σ and the value GiGi. The revision unit D05 revises σ←$σ^{GiGi}$ (U76). Also, the revision unit D05 deletes the partial document di (U77).

Finally, the setting unit D06 deletes the state (U78) and returns to the original processing (F001).

When the state of the partial document di is the state in which the partial document is sanitized and also the deletion is allowed (SDA), the partial document di is already revised into Gi=ID∥IDi∥GN(di). For that reason, the aggregate unit D09 aggregates the signature σ and the value GiGi. The revision unit D05 revises σ←$σ^{GiGi}$ (U79). Also, the revision unit D05 deletes the partial document di (U80). Finally, the setting unit D06 deletes the state (U81) and returns to the original processing (F001).

It should be noted that in the flow illustrated herein, after the specification unit D03 specifies the state of the partial document after the revision, the judgment unit D04 judges the current state of the partial document, and the processing is performed. It is also possible that the processing by the judgment unit D04 is performed before the processing by the specification unit D03, and with the processing by the specification unit, the state indicating the error is prohibited in accordance with the state of the partial document.

[Procedure for the Verification Processing]

Figure 8A:
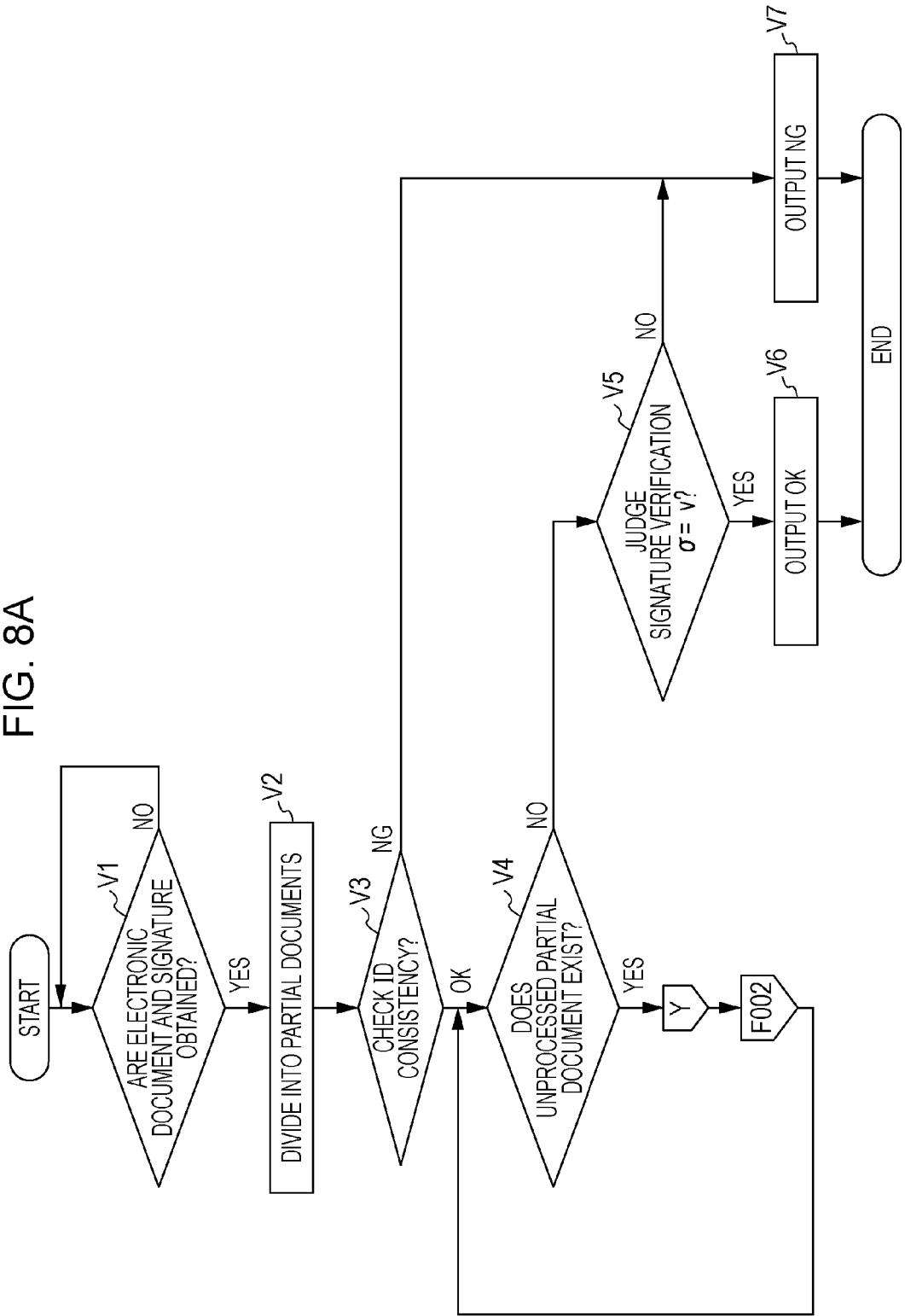
FIG. 8A is a first flow chart showing a procedure of the verification processing.
Figure 8B:
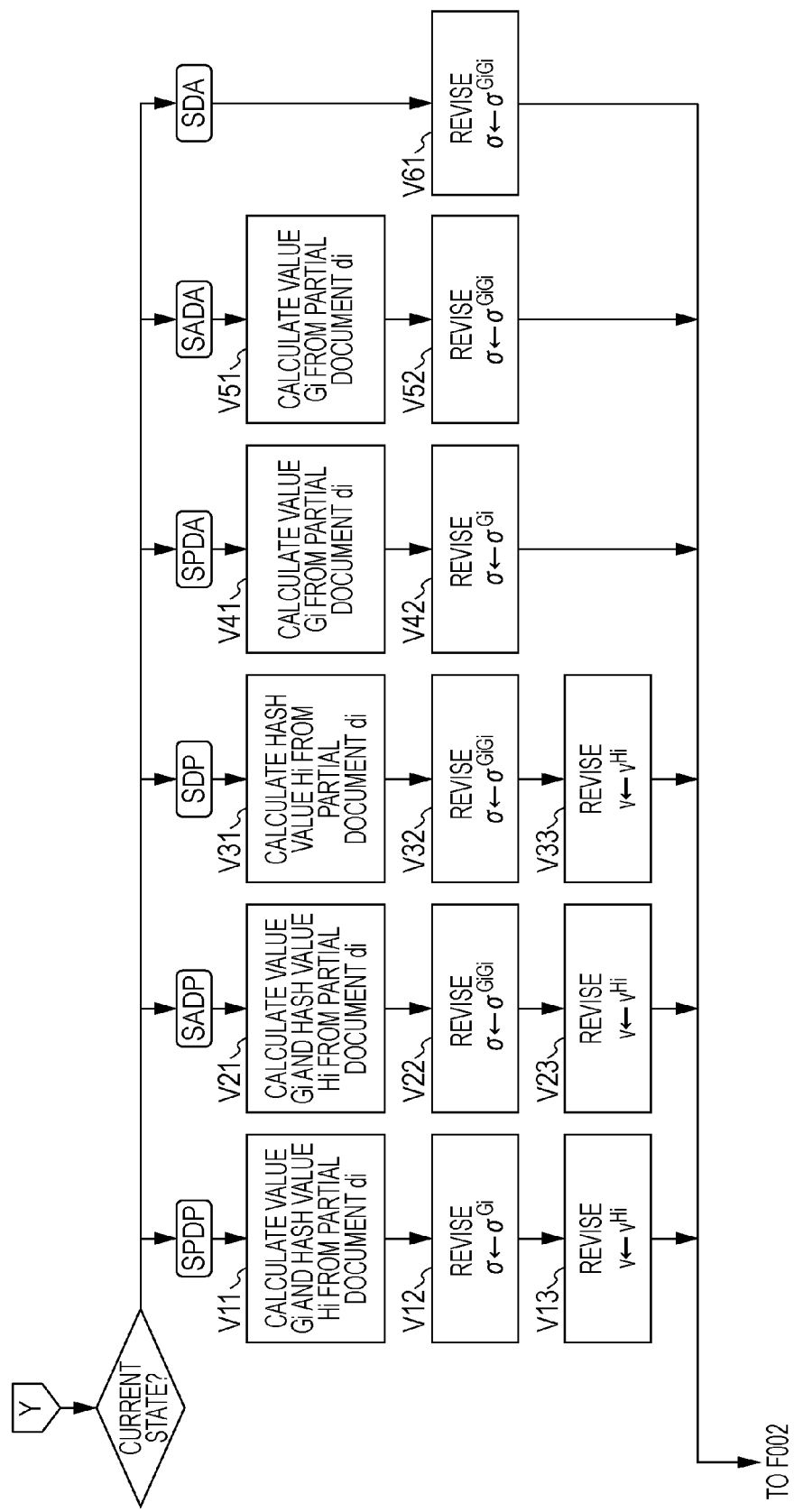
FIG. 8B is a second flow chart showing the procedure of the verification processing.
Figure 11:
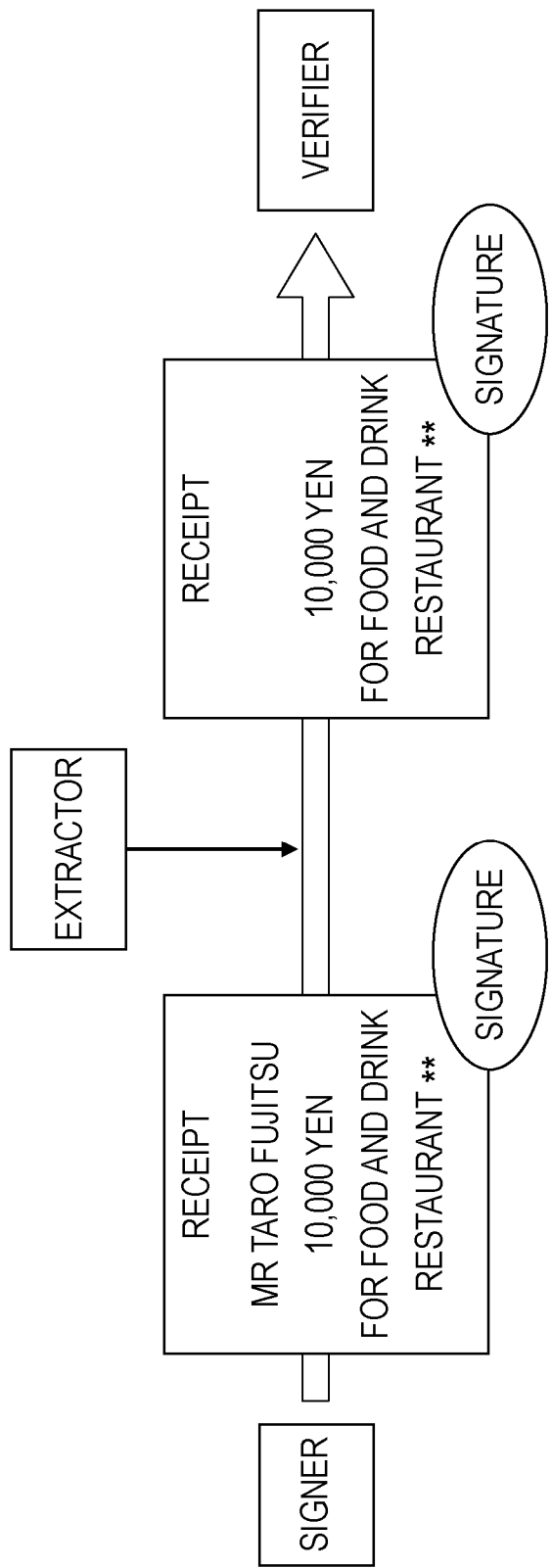
FIG. 11 schematically shows a concept of an extraction signature.

Next, a procedure for the electronic document signature processing executed by the document management apparatus 103 will be described. FIGS. 8A and 8B are flow charts showing a procedure for an electronic document revision processing executed by the document management apparatus.

In FIG. 8A, first, the input unit E01 functioning as the document management apparatus judges whether or not the signed document and an input of the signature are accepted (V1). At this time, in a case where the document M and the signature σ are input, the division unit E02 performs the division into the respective partial documents making up the document (V2). At this time, the input unit E01 accepts not only the signed document M but also the revised document R.

Next, the judgment unit E03 compares the values ID common to the respective partial documents to check whether or not all the values are the same (V3). If a different value ID exists, it is determined that the signed document is not valid. At this time, the output unit E05 outputs NG (V7) to end the verification processing. Also, the judgment unit E03 checks whether or not the values IDi unique to the respective partial documents are in the ascending order or the descending order (V3). If the values IDi are not in the ascending order or the descending order, it is determined that the signed document is not valid. At this time, the output unit E05 outputs NG (V7) to end the verification processing.

In the case of the signed document M, the states of the respective partial documents are all the state in which the sanitization is allowed and also the deletion is allowed (SADA). In the case of the revised document R, the partial document may hold the following six states including the state in which the sanitization is prohibited and also the deletion is prohibited (SPDP), the state in which the sanitization is allowed and also the deletion is prohibited (SADP), the state in which the partial document is sanitized and also the deletion is prohibited (SDP), the state in which the sanitization is allowed and also the deletion is allowed (SPDA), the state in which the sanitization is allowed and also the deletion is allowed (SADA), and the state in which the partial document is sanitized and also the deletion is allowed (SDA). It should be noted that in the case of the state in which the partial document is deleted (D), the partial document is deleted, and as the state of the partial document of the revised document R, the state in which the partial document is deleted (D) may not be adopted.

Next, the following processing is repeatedly performed with respect to the respective partial documents (V4). If an unprocessed partial document does not exist, the signature verification unit E09 judges whether or not the revision signature σ and the value v are the same value (V5). In the case of σ=v, the signature is valid, and the output unit E05 outputs OK (V6). In the case of σ≠v, the signature is not valid, and the output unit E05 outputs NG (V7). Then, the verification processing is ended.

The repeated processing for each of the partial documents is illustrated in FIG. 8B. First, the judgment unit E03 judges the current state of the partial document. The judgment unit E03 branches the processing depending on the six states including the state in which the sanitization is prohibited and also the deletion is prohibited (SPDP), the state in which the sanitization is allowed and also the deletion is prohibited (SADP), the state in which the partial document is sanitized and also the deletion is prohibited (SDP), the state in which the sanitization is prohibited and also the deletion is allowed (SPDA), the state in which the sanitization is allowed and also the deletion is allowed (SADA), the state in which the partial document is sanitized and also the deletion is allowed (SDA).

When the state of the partial document di is the state in which the sanitization is prohibited and also the deletion is prohibited (SPDP), from the partial document di, the hash unit E06 calculates the value Gi=ID∥IDi∥GN(di) and the hash value Hi=H(Gi) (V11). Then, the aggregate unit E07 aggregates the signature σ and the value Gi to revise σ←σ$^{Gi}$ (V12). Also, the aggregate unit E07 aggregates the value v included in the public key (or revised by the aggregate unit E07) and the hash value Hi to revise v←v$^{Hi}$ (V13). After that, the flow is returned to the original processing (F002).

When the state of the partial document di is the state in which the sanitization is allowed and also the deletion is prohibited (SADP), from the partial document di, the hash unit E06 calculates the value Gi=ID∥IDi∥GN(di) and the hash value Hi=H(Gi) (V21). Then, the aggregate unit E07 aggregates the signature σ and the value GiGi to revise σ←σ$^{GiGi}$ (V22). Also, the aggregate unit E07 aggregates the value v included in the public key (or revised by the aggregate unit E07) and the hash value Hi to revise v←v$^{Hi}$ (V23). After that, the flow is returned to the original processing (F002).

When the state of the partial document di is the state in which the partial document is sanitized and also the deletion is prohibited (SDP), the partial document di is already replaced by Gi=ID∥IDi∥GN(di). For that reason, from the partial document di, the hash unit E06 calculates the hash value Hi=H(di) (V31). Then, the aggregate unit E07 aggregates the signature σ and the hash value Hi to revise σ←σ$^{GiGi}$ (=σ$^{didi}$) (V32). Also, the aggregate unit E07 aggregates the value v included in the public key (or revised by the aggregate unit E07) and the hash value Hi to revise v←v$^{Hi}$ (V33). After that, the flow is returned to the original processing (F002).

When the state of the partial document di is the state in which the sanitization is prohibited and also the deletion is allowed (SPDA), from the partial document di, the hash unit E06 calculates the value Gi=ID∥IDi∥GN(di) (V41). Then, the aggregate unit E07 aggregates the signature σ and the value Gi to revise σ←σ$^{Gi}$ (V42). After that, the state is deleted, and the flow is returned to the original processing (F002).

When the state of the partial document di is the state in which the sanitization is allowed and also the deletion is allowed (SADA), from the partial document di, the hash unit E06 calculates the value Gi=ID∥IDi∥GN(di) (V51). Then, the aggregate unit E07 aggregates the signature σ and the value GiGi to revise σ←σ$^{GiGi}$ (=σ$^{didi}$) (V52). After that, the state is deleted, and the flow is returned to the original processing (F002).

When the state of the partial document di is the state in which the partial document is sanitized and also the deletion is allowed (SDA), the partial document di is already replaced by Gi=ID∥IDi∥GN(di). For that reason, the aggregate unit E07 aggregates the signature σ and the value Gi to revise σ←σ$^{Gi}$ (V61). After that, the state is deleted, and the flow is returned to the original processing (F002).

According to the above-mentioned embodiment, the seven states of the partial document to be realized are illustrated in FIG. 9. Also, the states of the transients are illustrated in FIG. 10.

As is apparent from the above description, According to an embodiment, the seven states may be set with respect to the partial document. Also, the verification may be regularly carried out by holding one piece of the digital signature data while the signature information amount is not in proportion to the number of the partial documents. Therefore, the more flexible revision on the electronic document is realized, and the usability for the user may be improved.

It should be noted that by providing programs for instructing a computer to execute the respective operations illustrated in the flow charts and steps shown in the above-mentioned embodiment, it is possible to provide the signature program of the present invention. These programs are recorded on a computer-readable medium and may be executed by a computer. The computer includes a host apparatus like a personal computer, a controller of a test apparatus, an MPU of a storage apparatus, a controller like a CPU, and the like. At this time, the computer-readable medium includes a portable storage medium such as a CD-ROM, a flexible disk, a DVD disk, an opto-magnetic disk, and an IC card, a database holding the computer programs or another computer and a database thereof, and further a transmission medium on a line.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although various embodiments of the present invention have been described in detail, it should be understood that the various changes, substitutions, and alterations could be made hereto without departing from the spirit and scope of the invention.

What is claimed is:

1. A method for generating a digital signature with respect to an electronic document, the method comprising:
inputting a target electronic document and a corresponding digital signature σ;
dividing the target electronic document into a plurality of partial documents mi; and
when a revision of the partial documents of the electronic document is to be performed,
in a case where deletion of the one partial document is to be performed,
when sanitization is not prohibited, exponentiating the digital signature σ twice with a hash value Gi obtained by using the one partial document to be deleted and a hash function G,
when sanitization is prohibited, exponentiating the digital signature with the hash value Gi, and
eliminating the partial document to be deleted while taking the hash function G;
in a case where sanitization of the one partial document is to be performed, replacing a part corresponding to the one partial document to be sanitized by the hash value Gi obtained by using the one partial document to be sanitized;

in a case where deletion of the one partial document is to be prohibited, using a hash function H, which is identical to or different from the hash function G, and exponentiating the digital signature σ with a hash value Hi obtained by using the partial document whose deletion is to be prohibited;

in a case where the sanitization of the one partial document is to be prohibited, exponentiating the digital signature G with the hash value Gi obtained by using the one partial document whose sanitization is to be prohibited; and updating the digital signature σ.

2. The digital signature method according to claim 1, wherein:

when a state of the one partial document whose revision is to be performed is a state in which the sanitization is allowed and the deletion is allowed, and in a case where a data including the one partial document mi is set as di, in a case where the one partial document is revised into a state in which the sanitization is prohibited and the deletion is allowed, the digital signature σ is revised into $\sigma^{Gi}$, and the data di is unchanged;

in a case where the one partial document is revised into a state in which the sanitization is allowed and the deletion is prohibited, the digital signature σ is revised into $\sigma^{Hi}$, and the data di is unchanged;

in a case where the one partial document is revised into a state in which the sanitization is prohibited and the deletion is prohibited, the digital signature σ is revised into $\sigma^{GiHi}$, and the data di is unchanged;

in a case where the one partial document is revised into a state in which the partial document is sanitized and the deletion is allowed, the digital signature σ is unchanged, and the data di is revised into Gi;

in a case where the one partial document is revised into a state in which the partial document is sanitized and the deletion is prohibited, the digital signature σ is revised into $\sigma^{Hi}$, and the data di is revised into Gi; and in a case where the one partial document is revised into a state in which the one partial document is deleted, the digital signature σ is revised into $\sigma^{GiGi}$, and the data di is deleted.

3. The digital signature method according to claim 2, wherein each of the partial documents is subjected to a state setting for setting a next state the each partial document is to be in.

4. The digital signature method according to claim 1, wherein the one partial document taking the hash function G or H is represented by di, where $$di = ID\|IDi\|mi,$$

where ∥ denotes concatenation of data positioned before and after the symbol, ID is a random number common to all the partial documents, and IDi are random numbers unique to the respective partial documents.

5. The digital signature method according to claim 1, wherein the revision of the electronic document is performed on the electronic document created by a signer of the digital signature and is verified on the basis of the signature σ.

6. The digital signature method according to claim 1, wherein:

when the revision of the electronic document is performed on the electronic document created by a signer of the digital signature is verified on the basis of the signature σ and a public key v, in a case where a state of the one partial document mi corresponding to the data di is a state in which the sanitization is prohibited and also the deletion is prohibited, from the data di, the hash value Gi and the hash value Hi are calculated to change σ so as to exponentiate the σ with Gi and also change v so as to exponentiate the v with Hi;

in a case where the state of the one partial document mi corresponding to the data di is a state in which the sanitization is allowed and also the deletion is prohibited, from the data di, the hash value Gi and the hash value Hi are calculated to change σ so as to exponentiate the G with Gi twice and also change v so as to exponentiate the v with Hi;

in a case where the state of the one partial document mi corresponding to the data di is a state in which the one partial document is sanitized and also the deletion is prohibited, from the data di, the hash value Hi is calculated to change σ so as to exponentiate the σ with Gi twice and also change v so as to exponentiate the v with Hi;

in a case where the state of the one partial document mi corresponding to the data di is a state in which the sanitization is prohibited and also the deletion is allowed, from the data di, the hash value Gi is calculated to change σ so as to exponentiate the σ with Gi;

in a case where the state of the one partial document mi corresponding to the data di is a state in which the sanitization is allowed and also the deletion is allowed, from the data di, the hash value Gi is calculated to change σ so as to exponentiate the σ with Gi twice;

in a case where the state of the one partial document mi corresponding to the data di is a state in which the partial document is sanitized and also the deletion is allowed, from the data di, the hash value Gi is calculated to change σ so as to exponentiate σ with Gi twice, and verify σ=v is verified.

7. A non-transitory computer-readable storage medium recording a digital signature program for instructing a computer to execute a digital signature method of generating a signature with respect to an electronic document, the digital signature program instructing the computer to execute:

inputting a target electronic document and a corresponding digital signature σ;

dividing the target electronic document into a plurality of partial documents mi; and when a revision of a partial document of the electronic document is performed, in a case where deletion of a partial document is performed, except for a case where sanitization is prohibited, exponentiating the digital signature σ twice with a hash value Gi obtained by using a partial document mi to be deleted and a hash function G, and in a case where the sanitization is prohibited, exponentiating the digital signature σ with the hash value Gi, and in both the cases, eliminating the partial document to be deleted while taking the hash function;

in a case where the sanitization of a partial document is performed, replacing a part corresponding to the partial document by the hash values Gi obtained by using the partial documents;

in a case where the deletion of a partial document is prohibited, using a hash function H which is identical to or different from the hash function G and exponentiating the digital signature σ with a hash value Hi obtained by using the partial document whose deletion is prohibited;

in a case where the sanitization of a partial document is prohibited, exponentiating the digital signature σ with a hash value Gi obtained by using the partial document whose sanitization is prohibited; and updating the digital signature σ.

8. The non-transitory computer-readable storage medium recording a digital signature program according to claim 7, wherein:

when a state of the partial document is a state in which the sanitization is allowed and the deletion is allowed, in a case where a data including the partial document mi is set as di, in a case where the partial document is revised into a state in which the sanitization is prohibited and the deletion is allowed, the digital signature σ is revised into $\sigma^{Gi}$, and the data di is unchanged;

in a case where the partial document is revised into a state in which the sanitization is allowed and the deletion is prohibited, the digital signature σ is revised into $\sigma^{Hi}$, and the data di is unchanged;

in a case where the partial document is revised into a state in which the sanitization is prohibited and the deletion is prohibited, the digital signature σ is revised into $\sigma^{GiHi}$, and the data di is unchanged;

in a case where the partial document is revised into a state in which the partial document is sanitized and the deletion is allowed, the digital signature σ is unchanged, and the data di is revised into Gi;

in a case where the partial document is revised into a state in which the partial document is sanitized and the deletion is prohibited, the digital signature σ is revised into $\sigma^{Hi}$, and the data di is revised into Gi; and in a case where the partial document is revised into a state in which the partial document is deleted, the digital signature σ is revised into $\sigma^{GiGi}$, and the data di is deleted.

9. The non-transitory computer-readable storage medium recording a digital signature program according to claim 7, wherein the respective partial documents are subjected to a state setting for judging on which state the partial document is in.

10. The non-transitory computer-readable storage medium recording a digital signature program according to claim 7, wherein the partial document taking the hash function is represented by di, where $$di = ID \| IDi \| mi$$

where ∥ denotes concatenation of data positioned before and after the symbol, ID is a random number common to all the partial documents, and IDi are random numbers unique to the respective partial documents.

11. The non-transitory computer-readable storage medium recording a digital signature program according to claim 7, wherein on the basis of the signature σ, it is verified whether or not the revision of the electronic document is performed on the electronic document created by a signer of the digital signature.

12. The non-transitory computer-readable storage medium recording a digital signature program according to claim 7, wherein:

when it is verified on the basis of the signature σ whether or not the revision of the electronic document is performed on the electronic document created by a signer of the digital signature and a public key v, in a case where a state of the partial document mi corresponding to the data di taking the hash function is a state in which the sanitization is prohibited and also the deletion is prohibited, from the data di, the hash value Gi and the hash value Hi are calculated to change σ so as to exponentiate the σ with Gi and also change v so as to exponentiate the v with Hi;

in a case where the state of the partial document mi corresponding to the data di is a state in which the sanitization is allowed and also the deletion is prohibited, from the data di, the hash value Gi and the hash value Hi are calculated to change σ so as to exponentiate the σ with Gi twice and also change v so as to exponentiate the v with Hi;

in a case where the state of the partial document mi corresponding to the data di is a state in which the partial document is sanitized and also the deletion is prohibited, from the data di, the hash value Hi is calculated to change σ so as to exponentiate the σ with Gi twice and also change v so as to exponentiate the v with Hi;

in a case where the state of the partial document mi corresponding to the data di is a state in which the sanitization is prohibited and also the deletion is allowed, from the data di, the hash value Gi is calculated to change σ so as to exponentiate the σ with Gi;

in a case where the state of the partial document mi corresponding to the data di is a state in which the sanitization is allowed and also the deletion is allowed, from the data di, the hash value Gi is calculated to change σ so as to exponentiate the σ with Gi twice;

in a case where the state of the partial document mi corresponding to the data di is a state in which the partial document is sanitized and also the deletion is allowed, from the data di, the hash value Gi is calculated to change σ so as to exponentiate σ with Gi twice, and verify σ=v is verified.

13. A digital signature apparatus for generating a signature with respect to an electronic document, the apparatus comprising:

input unit configured to input a target electronic document and a corresponding digital signature σ;

division unit configured to divide the target electronic document into a plurality of partial documents mi; and a revision update unit configured to, when a revision of a partial document of the electronic document is performed, in a case where deletion of a partial document is performed, except for a case where sanitization is prohibited, exponentiating the digital signature σ twice with a hash value Gi obtained by using a partial document mi to be deleted and a hash function G, and in a case where the sanitization is prohibited, exponentiating the digital signature σ with the hash value Gi, and in both the cases, eliminating the partial document to be deleted while taking the hash function;

in a case where the sanitization of a partial document is performed, replace a part corresponding to the partial document by the hash values Gi obtained by using the partial documents;

in a case where the deletion of a partial document is prohibited, use a hash function H which is identical to or different from the hash function G and exponentiate the digital signature σ with a hash value Hi obtained by using the partial document whose deletion is prohibited;

in a case where the sanitization of a partial document is prohibited, exponentiate the digital signature σ with a hash value Gi obtained by using the partial document whose sanitization is prohibited; and update the digital signature σ.

14. The digital signature apparatus according to claim 13, wherein in the revision update unit, when a state of the partial document is a state in which the sanitization is allowed and the deletion is allowed, in a case where a data including the partial document mi is set as di, in a case where the partial document is revised into a state in which the sanitization is prohibited and the deletion is allowed, the digital signature σ is revised into $\sigma^{Gi}$, and the data di is unchanged;

in a case where the partial document is revised into a state in which the sanitization is allowed and the deletion is prohibited, the digital signature σ is revised into $\sigma^{Hi}$, and the data di is unchanged;

in a case where the partial document is revised into a state in which the sanitization is prohibited and the deletion is prohibited, the digital signature σ is revised into $\sigma^{GiHi}$, and the data di is unchanged;

in a case where the partial document is revised into a state in which the partial document is sanitized and the deletion is allowed, the digital signature σ is unchanged, and the data di is revised into Gi;

in a case where the partial document is revised into a state in which the partial document is sanitized and the deletion is prohibited, the digital signature σ is revised into $\sigma^{Hi}$, and the data di is revised into Gi; and in a case where the partial document is revised into a state in which the partial document is deleted, the digital signature σ is revised into $\sigma^{GiGi}$, and the data di is deleted.

15. The digital signature apparatus according to claim 13, further comprising:

a state setting unit configured to perform a state setting on the respective partial documents for judging on which state the partial document is in.

16. The digital signature apparatus according to claim 13, wherein in the revision update unit, the partial document taking the hash function is represented by di, where $$di = ID \| IDi \| mi$$

where ∥ denotes concatenation of data positioned before and after the symbol, ID is a random number common to all the partial documents, and IDi are random numbers unique to the respective partial documents.

17. The digital signature apparatus according to claim 13, further comprising:

a verification unit configured to verify on the basis of the signature σ whether or not the revision of the electronic document is performed on the electronic document created by a signer of the digital signature.

18. The digital signature apparatus according to claim 13, further comprising:

a verification unit configured to, when it is verified on the basis of the signature σ whether or not the revision of the electronic document is performed on the electronic document created by a signer of the digital signature and a public key v, in a case where a state of the partial document mi corresponding to the data di is a state in which the sanitization is prohibited and also the deletion is prohibited, from the data di, calculate the hash value Gi and the hash value Hi to change σ so as to exponentiate the σ with Gi and also change v so as to exponentiate the v with Hi;

in a case where the state of the partial document mi corresponding to the data di is a state in which the sanitization is allowed and also the deletion is prohibited, from the data di, calculate the hash value Gi and the hash value Hi to change σ so as to exponentiate the σ with Gi twice and also change v so as to exponentiate the v with Hi;

in a case where the state of the partial document mi corresponding to the data di is a state in which the partial document is sanitized and also the deletion is prohibited, from the data di, calculate the hash value Hi to change σ so as to exponentiate the σ with Gi twice and also change v so as to exponentiate the v with Hi;

in a case where the state of the partial document mi corresponding to the data di is a state in which the sanitization is prohibited and also the deletion is allowed, from the data di, calculate the hash value Gi to change σ so as to exponentiate the σ with Gi;

in a case where the state of the partial document mi corresponding to the data di is a state in which the sanitization is allowed and also the deletion is allowed, from the data di, calculate the hash value Gi to change σ so as to exponentiate the σ with Gi twice;

in a case where the state of the partial document mi corresponding to the data di is a state in which the partial document is sanitized and also the deletion is allowed, from the data di, calculate the hash value Gi to change σ so as to exponentiate σ with Gi twice, and verify σ=v.

* * * * *